United States Patent
Mori et al.

(10) Patent No.: US 8,468,375 B2
(45) Date of Patent: Jun. 18, 2013

(54) ENERGY CONSUMPTION MANAGEMENT FOR STORAGE SYSTEM USING UPPER LIMIT VALUE DURING PREDETERMINED PERIOD

(75) Inventors: Hajime Mori, Yokohama (JP); Katsumi Ouchi, Kawasaki (JP); Yuichi Taguchi, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 523 days.

(21) Appl. No.: 12/602,691

(22) PCT Filed: Jul. 15, 2009

(86) PCT No.: PCT/JP2009/003344
§ 371 (c)(1),
(2), (4) Date: Dec. 2, 2009

(87) PCT Pub. No.: WO2011/007391
PCT Pub. Date: Jan. 20, 2011

(65) Prior Publication Data
US 2011/0016336 A1    Jan. 20, 2011

(51) Int. Cl.
*G06F 1/26* (2006.01)
*G06F 1/32* (2006.01)
(52) U.S. Cl.
USPC .......................................... 713/320; 700/291
(58) Field of Classification Search
USPC .................... 713/300, 320; 700/291
See application file for complete search history.

(56) References Cited

U.S. PATENT DOCUMENTS

| 6,986,064 | B2 * | 1/2006 | Yoshimoto et al. | 713/300 |
|---|---|---|---|---|
| 7,412,615 | B2 * | 8/2008 | Yokota et al. | 713/323 |
| 8,055,922 | B2 * | 11/2011 | Brittain et al. | 713/320 |
| 2005/0210304 | A1 | 9/2005 | Hartung et al. | |
| 2005/0268121 | A1 | 12/2005 | Rothman et al. | |
| 2007/0061512 | A1 * | 3/2007 | Taguchi et al. | 711/114 |
| 2007/0294552 | A1 * | 12/2007 | Kakihara et al. | 713/320 |
| 2008/0165714 | A1 * | 7/2008 | Dettinger et al. | 370/311 |
| 2008/0281473 | A1 * | 11/2008 | Pitt | 700/291 |
| 2009/0055520 | A1 | 2/2009 | Tabata et al. | |

FOREIGN PATENT DOCUMENTS
EP    1 594 038 A1    11/2005

* cited by examiner

*Primary Examiner* — Thomas Lee
*Assistant Examiner* — Xuxing Chen
(74) *Attorney, Agent, or Firm* — Mattingly & Malur, PC

(57) ABSTRACT

In a storage system environment in which an upper limit of electric energy consumption is prescribed for a specific period, operation of a storage device are enabled while keeping the electric energy consumption within the prescribed upper limit, and at the same time, maintaining operations of a disk device of a storage device necessary for providing services to a user. The storage system includes a storage device having one or more energized parts and a management device that manages operations of the storage device. The management device acquires electric energy consumption of the one or more energized parts and controls the operational state of the one or more energized parts so that the electric energy consumption of the storage device over a predetermined period does not exceed a prescribed upper limit.

12 Claims, 20 Drawing Sheets

| RG number | LU number |
|---|---|
| RG01 | LU01 |
|  | LU05 |
| RG02 | LU02 |
| RG03 | LU03 |
| RG04 | LU04 |
| ... | ... |

| Energized part | Power consumption | Power state |
|---|---|---|
| Entire device | 880 | None |
| Disk device 01 | 610 | None |
| RG01 | 200 | Normal |
| RG02 | 260 | Normal |
| RG03 | 0 | Suspended |
| RG04 | 150 | Slowdown |
| Undefined RG | 0 | Suspended |
| CTL01 | 100 | None |
| FAN01 | 20 | None |
| Power supply 01 | 100 | None |
| Other | 50 | None |
| ... | ... | ... |

FIG. 6

1214

| Power saving control unit | Normal state power | Slowdown state power | Suspended state power |
|---|---|---|---|
| RG01 | 200 | 100 | 0 |
| RG02 | 260 | 130 | 0 |
| RG03 | 180 | 90 | 0 |
| RG04 | 300 | 150 | 0 |
| Undefined RG | 60 | 30 | 0 |
| ... | ... | ... | ... |

2112

| Storage information | RG number | LU number | Mount information |
|---|---|---|---|
| Storage device 01 | RG01 | LU01 | Host server A: Drive E |
| Storage device 01 | RG01 | LU05 | Host server A: Drive F |
| Storage device 01 | RG02 | LU02 | Host server B: Drive D |
| Storage device 01 | RG03 | LU03 | Host server B: Drive E |
| Storage device 01 | RG04 | LU04 | Host server C: Drive G |
| ... | ... | ... | ... |

| Energized part | Measurement time | | | | ... |
|---|---|---|---|---|---|
| | October 3, 2004 13:35 to 13:36 | | October 3, 2004 13:37 to 13:38 | | ... |
| | Power consumption log | State log | Power consumption log | State log | ... |
| Storage device 01: Entire device | 880 | None | 950 | None | ... |
| Storage device 01: Disk device 01 | 610 | None | 680 | None | ... |
| Storage device 01: RG 01 | 200 | Normal | 200 | Normal | ... |
| Storage device 01: RG 02 | 260 | Normal | 0 | Suspended | ... |
| Storage device 01: RG 03 | 0 | Suspended | 180 | Normal | ... |
| Storage device 01: RG 04 | 150 | Slowdown | 300 | Normal | ... |
| Storage device 01: Undefined RG | 0 | Suspended | 0 | Suspended | ... |
| Storage device 01: CTL 01 | 100 | None | 100 | None | ... |
| Storage device 01: FAN 01 | 20 | None | 20 | None | ... |
| Storage device 01: Power supply 01 | 100 | None | 100 | None | ... |
| Storage device 01: Other | 50 | None | 50 | None | ... |
| ... | ... | ... | ... | ... | ... |

FIG. 9

| Scheduled time (21141) | Energized part (21142) | Past result power consumption (21143) | Past result state (21144) | State transition schedule (21145) | Scheduled power reduction (21146) |
|---|---|---|---|---|---|
| October 3, 2005 13:35 to 13:36 | Storage device 01: Entire device | 880 | -- | -- | -- |
| | Storage device 01: Disk device 01 | 610 | -- | -- | -- |
| | Storage device 01: RG 01 | 200 | Normal | Normal | 0 |
| | Storage device 01: RG 02 | 260 | Normal | Slowdown | 130 |
| | Storage device 01: RG 03 | 0 | Suspended | Suspended | 0 |
| | Storage device 01: RG 04 | 150 | Slowdown | Normal | -150 |
| | Storage device 01: CTL 01 | 100 | -- | -- | -- |
| | Storage device 01: FAN 01 | 20 | -- | -- | -- |
| | Storage device 01: Power supply 01 | 100 | -- | -- | -- |
| | Storage device 01: Other | 50 | -- | -- | -- |
| | ... | ... | ... | ... | ... |

| Power saving control unit (21151) | State after transition (21152) | State transition condition | |
|---|---|---|---|
| | | Scheduled excess electric energy limitation (21154) | Time limitation (21155) |
| RG01 | Slowdown | No state transition | No state transition |
| | Suspended | No state transition | No state transition |
| RG02 | Slowdown | No limitation | No limitation |
| | Suspended | 0 or more | No limitation |
| RG03 | Slowdown | 0 or more | No limitation |
| | Suspended | No limitation | 18:00 to 8:30 |
| RG04 | Slowdown | 0 or more | Odd days |
| | Suspended | No limitation | 6:00 to 23:00 |
| | | 500 or more | Odd days |
| ... | ... | ... | ... |

| Power saving control unit (21161) | State after transition (21162) | Priority (21163) |
|---|---|---|
| RG01 | Slowdown | 1 |
| RG01 | Suspended | 1 |
| RG02 | Slowdown | 4 |
| RG02 | Suspended | 1 |
| RG03 | Slowdown | 3 |
| RG03 | Suspended | 3 |
| ... | ... | ... |

FIG. 12

| Prescribed electric energy (21171) | Scheduled total electric energy consumption (21172) | Scheduled total electric energy reduction (21173) | Scheduled total excess electric energy (21174) |
|---|---|---|---|
| 4000 | 5000 | 600 | 400 |

| 21181 | 21182 | 21183 | 21184 | 21185 |
|---|---|---|---|---|
| Current electric energy consumption scheduled value | Current electric energy consumption | Current excess electric energy | End-of-period electric energy reduction scheduled value | End-of-period excess electric energy scheduled value |
| 2000 | 2500 | 500 | 300 | 200 |

| 21191 | 21192 | 21193 |
|---|---|---|
| Current time | Start time | End time |
| September 5, 2005 19:30 | August 1, 2005 00:00 | October 31, 2005 00:00 |

FIG. 21

| Application identifier | LU identifier | Application operational state | Number of logins | Application importance |
|---|---|---|---|---|
| Application A | Storage device 01: LU 01 | In operation | 5000 | 1 |
| Application B | Storage device 01: LU 03 | Suspended | 0 | 4 |
| Application B | Storage device 01: LU 04 | Suspended | 0 | 4 |
| ... | ... | ... | ... | ... |

Column IDs: 31141, 31142, 31143, 31144, 31145. Table 3114.

FIG. 22

| Application identifier | Reservation job identifier | Reservation job time |
|---|---|---|
| Application A | None | None |
| Application B | Job 01 | Daily 23:00 to 8:00 |
|  | Job 02 | Every 3rd Sunday 10:00 to 20:00 |
| ... | ... | ... |

Column IDs: 31151, 31152, 31153. Table 3115.

FIG. 23

| Power saving control unit | State after transition | State transition condition ||| |
|---|---|---|---|---|
| | | Scheduled excess electric energy limitation | Time limitation | Application limitation |
| RG01 | Slowdown | No state transition | No state transition | Application operational state: Suspended |
| | Suspended | No state transition | No state transition | Application operational state: Suspended |
| RG02 | Slowdown | No limitation | No limitation | No limitation |
| | Suspended | 0 or more | No limitation | Application operational state: Suspended |
| RG03 | Slowdown | 0 or more | No limitation | Number of logins: 100 or less |
| | Suspended | No limitation | Every 3rd Sunday Other than 10:00 to 20:00 | Number of logins: 0 |
| RG04 | Slowdown | 0 or more | Odd days | Application operational state: Stand-by |
| | Suspended | No limitation | Other than 23:00 to 8:00 | No limitation |
| | | 500 or more | Other than 23:00 to 8:00 | No limitation |
| ... | ... | ... | ... | ... |

2115

ENERGY CONSUMPTION MANAGEMENT FOR STORAGE SYSTEM USING UPPER LIMIT VALUE DURING PREDETERMINED PERIOD

The present invention relates to electronic devices such as a storage device.

BACKGROUND ART

A storage device is managed by a RAID (Redundant Array of Inexpensive Disks) method, and includes a plurality of disk devices arranged in an array and a control unit that controls the plurality of disk devices. A storage device is connected to a host computer such as a server (hereinafter also referred to as a host server), and provides a logical storage area (hereinafter also referred to as a logical volume) arranged so as to be redundant based on a RAID structure.

In recent years, the amount of data to be managed by corporations and the like is increasing on a daily basis. Accordingly, storage devices have become increasingly larger in scale, resulting in an increase in power consumption. In addition, there is an upward trend in the number of electronic devices including storage devices to be installed at a data center or the like, and the power consumption by an entire data center is also on the rise. In the present description, an electronic device refers to a device that becomes operational through energization.

Meanwhile, as the power consumption of electronic devices increases, the amount of released heat also increases, which in turn causes an increase in the power consumption of cooling facilities at the data centers.

When charging a user for electricity used by an electronic device installed by the user at a data center, a data center provider may prescribe, in advance, an upper limit on the electric energy to be supplied to one or more electronic devices used by the user within a specific period (usually the contract period). When the electric energy consumed by the user during the aforementioned period exceeds the electric energy upper limit prescribed in advance, the data center provider may additionally bill an extra charge for the exceeded electric energy. Electric energy refers to a value calculated as a summation of the accumulated products of power and time.

Various electronic devices to be installed at a data center or the like include electronic devices capable of shifting from a normal operational state to a power-saving state, as well as electronic devices equipped with an energized part capable of reducing power consumption compared to a normal operational state during suspension of energization or the like and which have a power-saving function realized by performing operational control of the energized part.

For example, a technique for limiting power consumption by a storage device included in an electronic device is disclosed in Patent Citation 1. Patent Citation 1 discloses a technique which predicts, upon activation of a disk device, the power consumption after activation, determines whether or not the predicted power consumption exceeds a preset threshold, and controls activation and suspension of the disk device according to the determination. According to Patent Citation 1, by controlling activation and suspension of the disk device, the power consumption of the storage device can be limited to or below a preset threshold and, consequently, the power consumption by the storage device can be reduced.

CITATION LIST

Patent Literature

[PTL (Patent Literature) 1]
U.S. Published Application No. 2005/0210304

SUMMARY OF INVENTION

Technical Problem

Although the technique described in Patent Citation 1 presented above is capable of reducing instantaneous power consumption, no considerations are made to limit the electric energy consumed during a given period to within a prescribed range. As an example in which such a prescription exists, an environment is envisioned in which an upper limit of electric energy consumption that is an integrated summation of power consumption during a specific period (for example, in units of several months or the like) is prescribed in advance.

With Patent Citation 1 described above, no considerations are made for an arrangement involving, for example, setting thresholds at respective timings during the aforementioned period in order to limit the electric energy consumption of a storage device during the period to within a prescribed upper limit, and using the thresholds to limit the power consumption of the storage device.

In other words, with the technique described in aforementioned Patent Citation 1, while the instantaneous power consumption of a storage device at a given timing can be limited, it is difficult to provide services required by the user while efficiently limiting the power consumption of the storage device so as to limit the total electric energy consumption during a specific period to within a prescribed upper limit.

The power consumption of a storage device is not always constant. For example, the power consumption of individual disk devices included in a storage device may vary due to the frequency and patterns of access to a disk drive. Power consumption may also vary when the storage device shifts to a power-saving state. Therefore, the electric energy consumption of a storage device varies with time in accordance with variations in power consumption due to the usage of the storage device.

According to Patent Citation 1 described above, when limiting the power consumption of a storage device according to a preset power consumption threshold, there is a risk that an instantaneous limitation due to a threshold unnecessarily limits operations of the storage device even though there is leeway in the electric energy consumption over the entire period. For example, an instantaneous increase in the use of the storage device at a given timing may cause power consumption to exceed the aforementioned threshold, resulting in an instantaneous limitation of the operation of the disk device. As a result, even though there is still leeway in the electric energy consumption over the entire period, since the operation of the disk device is limited, the storage device may no longer be able to provide services required by the user.

With Patent Citation 1 described above, there is also a risk that an opposite disadvantage may occur. For example, let us consider a case where the power consumption threshold of the storage device is set high so as to allow the disk device that provides services required by the user to be sufficiently operational. In this case, there is a risk that the disk device is extraneously operated and power is wastefully consumed if the power consumption is equal to or below the aforementioned threshold even when there is no leeway in the prescribed electric energy consumption for the specific period. In particular, wastefulness increases when the storage device is not heavily used and low power consumption will suffice. Furthermore, environments such as a data center in which exceeding a prescribed electric energy consumption results in extra charge are also disadvantageous from a cost perspective.

The present invention has been made in order to solve problems such as those described above, and an object thereof is to provide a technique that enables, in an environment in which an upper limit of the electric energy consumption is prescribed for a specific period, operations of a storage device while keeping the electric energy consumption within the prescribed upper limit and, at the same time, maintaining operations of a disk device of a storage device necessary for providing services to a user.

Solution to Problem

A storage system according to the present invention includes a storage device having one or more energized parts and a management device that manages operations of the storage device. The management device acquires electric energy consumption of the energized part and controls the operational state of the energized part so that the electric energy consumption of the storage device over a predetermined period does not exceed a prescribed upper limit.

Advantageous Effects of Invention

With the storage system according to the present invention, the operational status of a storage device can be controlled using, as reference, whether or not the electric energy consumption of the storage device over a predetermined period exceeds a prescribed upper limit. Consequently, regardless of instantaneous load increases/decreases, the storage device enables necessary services to be provided while keeping the electric energy consumption over a period within a prescribed upper limit.

BRIEF DESCRIPTION OF DRAWINGS

FIG. 6 is a diagram showing a configuration example of power saving control unit information 1214 stored in the main memory 1210 of the storage device 1000.

FIG. 7 is a diagram showing a configuration example of volume management information 2112 stored in a main memory 2100 of the management server 2000.

FIG. 8 is a diagram showing a configuration example of power consumption history log information 2113 stored in the main memory 2100 of the management server 2000.

FIG. 9 is a diagram showing a configuration example of power limitation information 2114 stored in the main memory 2100 of the management server 2000.

FIG. 10 is a diagram showing a configuration example of state transition condition information 2115 stored in the main memory 2100 of the management server 2000.

FIG. 11 is a diagram showing a configuration example of state transition priority information 2116 stored in the main memory 2100 of the management server 2000.

FIG. 12 is a diagram showing a configuration example of scheduled total electric energy information 2117 stored in the main memory 2100 of the management server 2000.

FIG. 13 is a diagram showing a configuration example of electric energy limitation information 2118 stored in the main memory 2100 of the management server 2000.

FIG. 14 is a diagram showing a configuration example of time management information 2119 stored in the main memory 2100 of the management server 2000.

FIG. 21 is a diagram showing a configuration example of application management information 3114 stored in a memory 3100.

FIG. 22 is a diagram showing a configuration example of application operation reservation information 3115 stored in the memory 3100.

FIG. 23 is a diagram showing a configuration example of state transition condition information 2115 stored in the main memory 2100 of the management server 2000.

DESCRIPTION OF EMBODIMENTS

Figure 1:
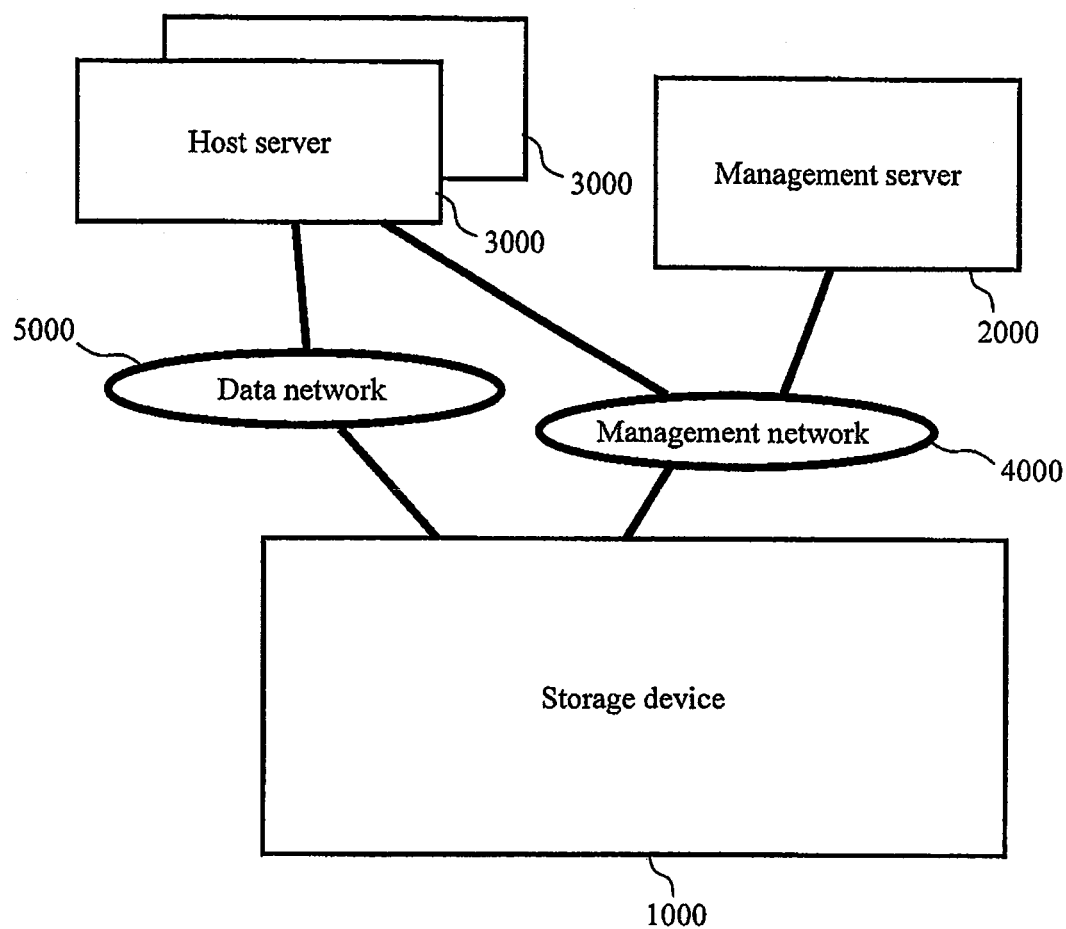
FIG. 1 is a block configuration diagram of a storage system according to a first embodiment.

Hereinafter, embodiments of the present invention will be described. However, it is to be understood that all embodiments are merely exemplary and by no means is the present invention limited to these embodiments. In the following description, the premises of each embodiment will be described first, followed by a detailed explanation of the embodiment.

In the following description of the embodiments, it is to be assumed that a storage device includes at least one part to be energized (hereinafter also referred to as an energized part) among the components thereof. The operational state of an energized part can transition between a normal operational state and a power-saving state. When viewing an energized part as a unit on which power saving control is to be performed, the energized part may also be referred to as a power saving control unit. Specific examples of energized parts or power saving control units in a storage device include a RAID structure unit (hereinafter also referred to as a RAID group or an RG) made up of one or more physical disks.

Power saving control units are not necessarily limited to RAID group units. For example, a power saving control unit may be a storage device, a rack storing a storage device, a disk device, a logical volume, a physical disk, or the like. In addition, an object that transitions to a power saving state need not necessarily be limited to a physical disk, and may be any part that becomes operational by energization, such as a fan, a control board, a cache memory, a CPU, a power source, and a battery. Alternatively, the power saving control unit may be a system unit including a storage device and a host server that connects to the storage device. Moreover, a combination of the above shall also suffice.

The power saving function is not limited to just a method in which a transition to a power saving state takes place per power saving control unit. For example, any method can be used as long as a function is provided which is capable of reducing the power consumption of an energized part, such as a power saving function due to data capacity reduction by data compression or data reduplication.

In the following description of the embodiments, it is assumed that the three states of normal, slowdown, and suspended exist in the operational states of a RAID group due to the power saving function of a storage device. Operational states of a RAID group transition among these states (hereinafter also referred to as state transition). Among these states, the slowdown state and the suspended state may also be referred to as power saving states.

A normal state of a RAID group is assumed to be a state in which one or more physical disks that make up the RAID group are capable of processing read/write requests from another device (such as a host server) at normal capacity. In this case, a state in which read/write requests can be processed refers to, for example, a state where the power of a control unit included in a physical disk is turned on and a storage medium (for example, a disk (also called a "platter")) included in a disk device is rotating.

A slowdown state of a RAID group is assumed to be a state in which the electric energy consumption of one or more physical disks that make up the RAID group is lower than in the normal state and the capability of processing read/write requests has been reduced. In a slowdown state, for example, the number of rotations of a platter is smaller than in the normal state and, accordingly, the processing capability is lower than the normal state.

A suspended state of a RAID group is assumed to be a state in which the power consumption of one or more physical disks that make up the RAID group is lower than in the slowdown state and reading/writing of data cannot be performed. Specific examples of a suspended state include a state in which the rotation of a platter has been suspended, a state in which a control unit included in a disk device is turned off or is in a power saving mode, and a state where energization has been stopped and the supply of power has been suspended.

It is assumed that a RAID group is capable of transitioning from each of the states to any state.

While the following embodiments are described using an example of a physical disk using a hard disk drive as a part for storing data from a host of a storage system, a recording device that uses a medium other than a physical disk may be employed instead. For example, conceivable recording devices include a semiconductor memory device, a flash memory device, an optical disk drive, a magneto-optic disk drive, a magnetic tape device, and a holographic memory device.

First Embodiment

A first embodiment of the present invention will now be described with reference to the drawings.

FIG. 1 is a block configuration diagram of a storage system according to the first embodiment of the present invention. The storage system according to the present first embodiment includes a storage device 1000, a management server 2000, and a host server 3000. There may either be one each or a plurality each of the storage device 1000, the management server 2000 and the host server 3000.

It is assumed that each device making up the storage system includes a CPU or the like having a timer function, and that the same time is respectively retained by all of the devices. An arbitrary method may be used to synchronize the time of each device. For example, a clock server including a clock function may be prepared on a management network 4000, whereby all the devices may periodically inquire of the aforementioned server for the time so as to share the same time. In the following description, it is assumed that a CPU of each device includes a timer function.

The storage device 1000 is connected to the host server 3000 via a data network 5000 such as a SAN (Storage Area Network), and provides the host server 3000 with a storage area. In addition, the storage device 1000 connects to the management server 2000 via a management network 4000 such as a LAN (Local Area Network). Further configurations of the storage device 1000 will be described later.

While not shown in FIG. 1, the host server 3000 includes an input unit, a display unit, a CPU, a memory, a data I/F for connecting to the data network 5000, and a management I/F for connecting to the management network 4000. The host server 3000 executes applications such as a business program. The host server 3000 writes an application processing result into the storage device 1000 via the data network 5000 or reads data during application processing from the storage device 1000 via the data network 5000. The host server 3000 can be constituted by, for example, a general computing machine.

In addition, the host server 3000 connects to the management server 2000, to be described later, via the management network 4000 and provides information of the host server 3000. For example, operational information of an application such as a business program running on the host server 3000 and configuration information regarding which of the information resources of the storage device 1000 is used by the host server 3000 are to be provided. Furthermore, under instructions from the management server 2000, the host server 3000 is also capable of executing and suspending an application such as a business program as well as changing settings thereof.

The management server 2000 connects to the storage device 1000 and the host server 3000 via the management network 4000. Detailed configurations of the management server 2000 will be described later.

Figure 2:
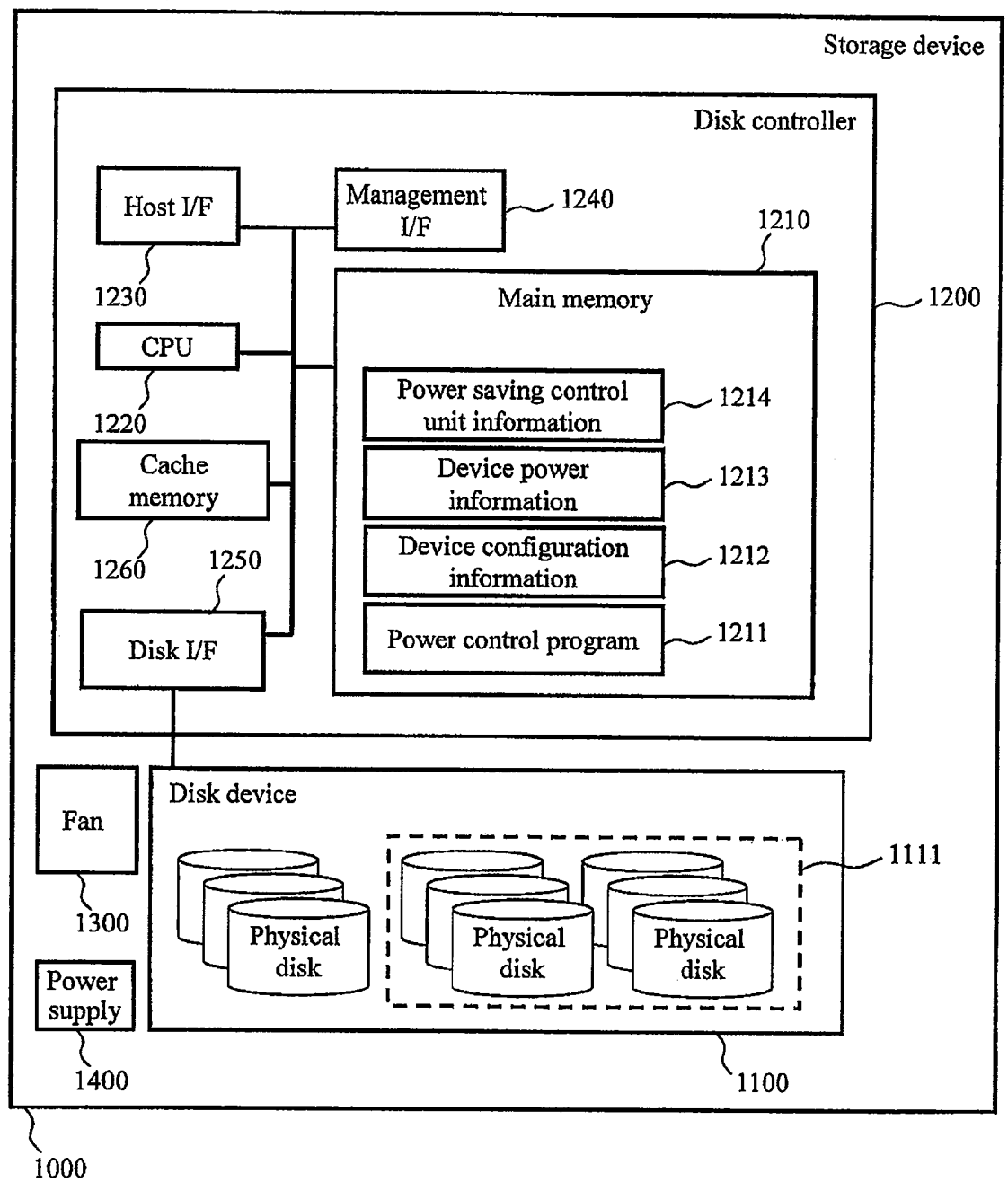
FIG. 2 is a block configuration diagram of a storage device 1000 according to the first embodiment.

FIG. 2 is a block configuration diagram of the storage device 1000 according to the present first embodiment.

The storage device 1000 includes a disk device 1100, a disk controller 1200 (hereinafter also referred to as a CTL), a fan 1300, and a power source 1400.

The disk controller 1200 includes a main memory 1210, a CPU (Central Processing Unit) 1220, a host I/F 1230, a management I/F 1240, a disk I/F 1250, and a cache memory 1260.

The CPU 1220 is a processor that executes a program stored in the main memory 1210 to control the respective parts in the storage device 1000. The CPU 1220 is capable of, for example, controlling input/output processing of data stored by a physical disk disposed inside the disk device 1100 in response to data input/output requested by the host server 3000. In addition, the CPU 1220 is equipped with a timer function.

The host I/F 1230 is an interface that connects to the host server 3000 via the data network 5000 and performs data input/output.

The management I/F 1240 is an interface that connects to the management server 2000 via the management network 4000 and performs input/output of management information.

The disk I/F 1250 is an interface connected to the disk device 1100 which controls one or more physical disks included in the disk device 1100 and performs data input/output.

The cache memory 1260 temporarily stores write data for the disk drive 1100 or read data from the disk drive 1100.

The main memory 1210 stores device configuration information 1212, device power information 1213, and power saving control unit information 1214 as management data or control data of the storage device 1000. In addition, the main memory 1210 also stores a power control program 1211 for controlling the power consumption of the storage device 1000. A description thereof will be given later.

The cache memory 1260 and the main memory 1210 may either be a volatile memory or a nonvolatile memory (such as a flash memory). In addition, the CPU 1220, the cache memory 1260 and the main memory 1210 may be made redundant by duplexing or the like. The disk controller 1200 itself may be made redundant by duplexing or the like.

The fan 1300 is a device that cools the respective parts inside the storage device 1000. One or more fans 1300 may be used. A different cooling mechanism such as a cooling water circulating pump or a heat exchanger can be adopted instead of the fan 1300.

The power source 1400 connects to a power source outside of the storage device 1000 and supplies power to the respective parts in the storage device 1000. One or more power sources 1400 may be used.

The disk device 1100 is configured as a storage device including one or more physical disks. Each physical disk is connected to the disk I/F 1250. The physical disks are grouped inside the disk device 1100, and one or more physical disks belong to one or a plurality of RAID groups 1111. All or a portion of a storage area in a physical disk included in a RAID group 1111 is defined as a logical volume, and is provided to the host server 3000 as a virtual (or logical) storage device. In addition, there may be physical disks not included in a RAID group 1111 as a backup in case of a physical disk failure or the like.

In the present first embodiment, such physical disks not included in the RAID group 1111 are collectively handled as an undefined RG. Moreover, physical disks not included in the RAID group 1111 need not necessarily be handled collectively, and a different classification may be used in accordance with the usage, mounting sites, or the like of the physical disks.

One or a plurality of disk devices 1100 may be used. Furthermore, it is assumed that the disk device 1100 and the disk controller 1200 can be stored in different chassis. In such a case, it is assumed that the chassis on which the disk controller 1200 is mounted and the chassis on which the disk device 1100 is mounted are to be connected by a network enabling data input/output, and each chassis can be separately mounted with a fan and a power source.

Figure 3:
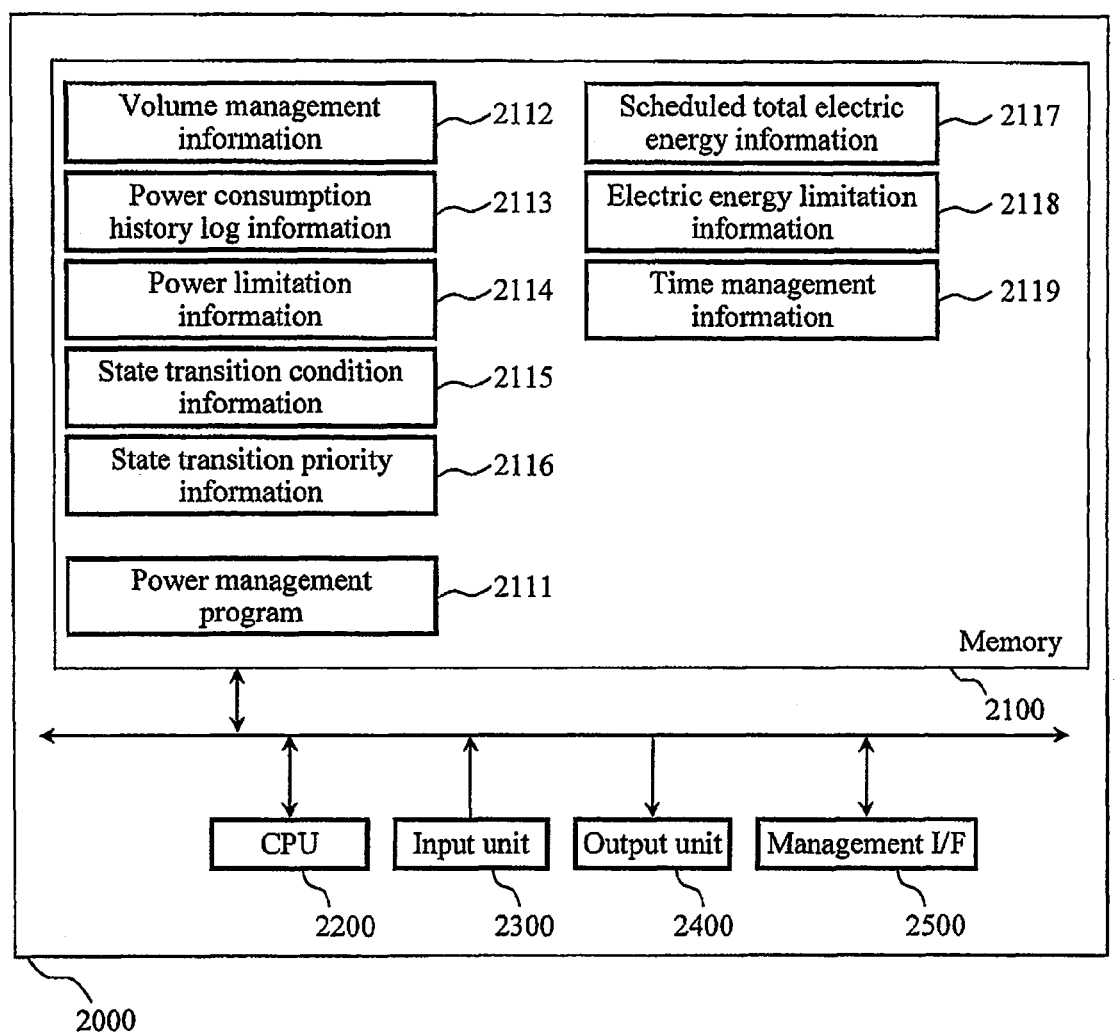
FIG. 3 is a block configuration diagram of a management server 2000 according to the first embodiment.

FIG. 3 is a block configuration diagram of the management server 2000 according to the present first embodiment.

The management server 2000 can be configured by a general computing machine, and includes a memory 2100, a CPU 2200, an input unit 2300, an output unit 2400, and a management I/F 2500.

The memory 2100 stores a power management program 2111, volume management information 2112, power consumption history log information 2113, power limitation information 2114, state transition condition information 2115, state transition priority information 2116, scheduled total electric energy information 2117, electric energy limitation information 2118, and time management information 2119. A description thereof will be given later.

The CPU 2200 executes a program stored in the main memory 2100 and controls the respective parts inside the management server 2000. In addition, the CPU 2200 is equipped with a timer function.

The input unit 2300 is an operation input device such as a keyboard or a mouse.

The output unit 2400 is an information output device such as a display.

The management I/F 2500 connects to the management network 4000.

Heretofore, the respective devices that make up the storage system according to the present first embodiment have been described. Various information to be stored by the main memory 1210 of the storage device 1000 will now be described.

Figure 4:
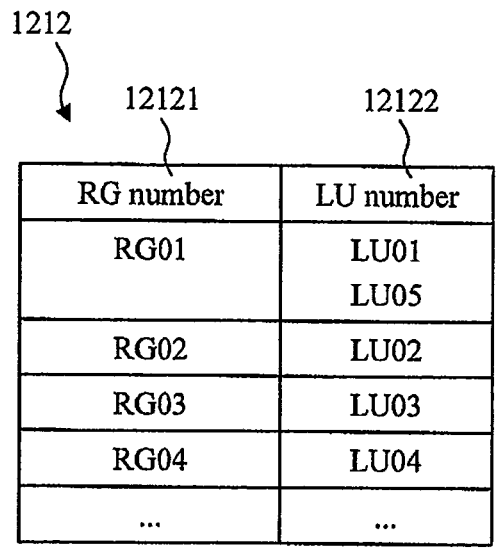
FIG. 4 is a diagram showing a configuration example of device configuration information 1212 stored in a main memory 1210 of the storage device 1000.

FIG. 4 is a diagram showing a configuration example of device configuration information 1212 stored in the main memory 1210 of the storage device 1000. Device configuration information 1212 retains information indicating allocation units of RAID groups.

Device configuration information 1212 retains an RG number 12121 and an LU number 12122.

The RG number 12121 retains an identifier of a RAID group made up of one or more physical disks included in the storage device 1000.

The LU number 12122 retains a combination of identifiers of a logical volume configured on a RAID group specified by the value of the RG number 12121.

By acquiring and referencing device configuration information 1212, a device such as the management server 2000 can grasp a correspondence relationship between a logical unit (LU) allocated to the host server 3000 or the like and a RAID group.

Figure 5:
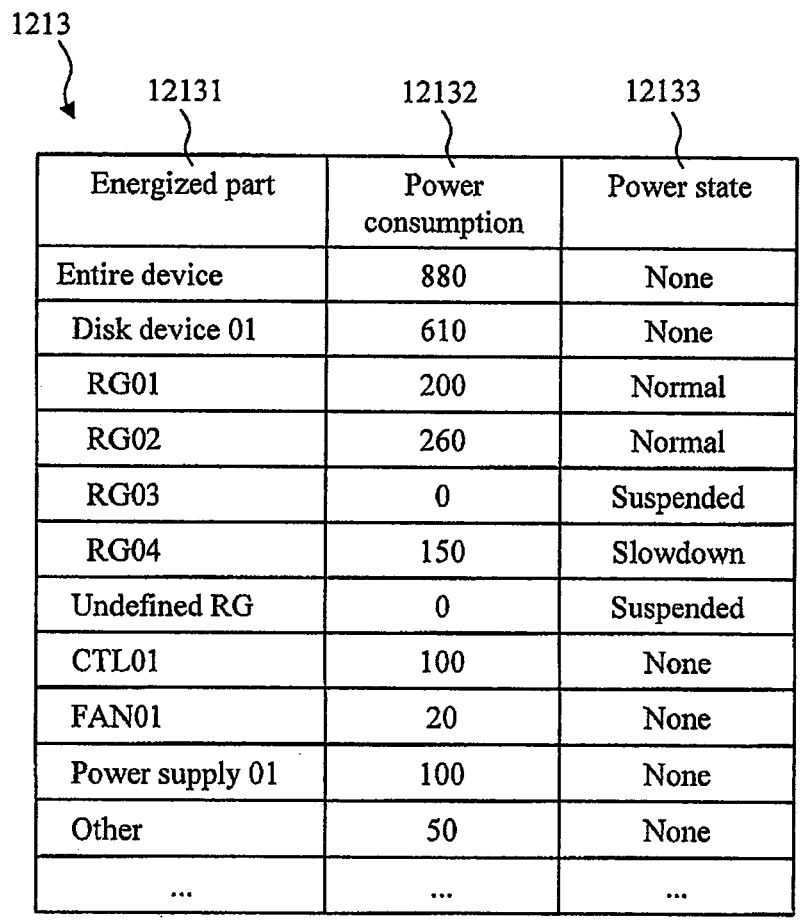
FIG. 5 is a diagram showing a configuration example of device power information 1213 stored in the main memory 1210 of the storage device 1000.

FIG. 5 is a diagram showing a configuration example of device power information 1213 stored in the main memory 1210 of the storage device 1000. Device power information 1213 retains information indicating current power consumption of each energized part of the storage device 1000.

Device power information 1213 retains an energized part 12131, a power consumption 12132, and a power state 12133.

The energized part 12131 retains an identifier of an energized part of the storage device 1000. In FIG. 5, for simplicity of description, the names of the respective parts are denoted as-is as identifiers. Moreover, in order to count power consumption information in units of the disk device 1100 and the storage device 1000, the energized part 12131 also retains identifiers of the disk device 1100 and the storage device 1000.

The power consumption 12132 retains a value of current power consumption of an energized part specified by the value of the energized part 12131.

When an energized part specified by the value of the energized part 12131 is capable of transitioning to a plurality of operational states due to the power saving function, the power state 12133 retains a current operational state of the energized part concerned. When the energized part 12131 does not perform a state transition due to the power saving function or, in other words, when the energized part 12131 is not a power saving control unit, "none" is set as the value of the power state 12133.

The value retained by the power consumption 12132 may be a value measured by installing a power meter for each of the aforementioned energized parts or a value estimated from operational information or the like of the energized parts. In addition, a value already disclosed in catalog specifications or the like may be used. When individual power consumption of each energized part is unknown, power consumption may be grasped for a larger unit including the energized part, whereby the value thereof is to be retained in device power information 1213.

In FIG. 5, while the disk device 1100 and the RAID groups 1111 are depicted side by side and the inclusion relations of the respective energized parts are depicted by inserting indents for simplicity of description, FIG. 5 may alternatively be depicted by associating the disk device 1100 with the RAID groups 1111 so that it is more evident that the RAID groups 1111 are included in the disk device 1100. This reasoning similarly applies to the drawings described below.

In addition, in FIG. 5, while it is assumed that power consumption in units of physical disk is unknown and power consumption is described in units of RAID group made up of one or more physical disks, it is understood that power consumption may be described in units of physical disk if acquirable.

Furthermore, although not shown in FIG. 5, information on the time at which power consumption is gathered is assigned to device power information 1213. For example, when a power meter attached to an energized part of the storage device 1000 measures power in 1 minute intervals, measurement start times and measurement end times of power consumption are to be assigned in minutes to device power information 1213. Electric energy consumption for a time interval can be obtained by multiplying the value of power consumption 12132 with the acquisition interval of device power information 1213.

FIG. 6 is a diagram showing a configuration example of power saving control unit information 1214 stored in the main memory 1210 of the storage device 1000. Power saving control unit information 1214 retains information describing power consumption per operational state of power saving control units.

Power saving control unit information 1214 retains a power saving control unit 12141, a normal state power 12142, a slowdown state power 12143, and a suspended state power 12144.

The power saving control unit 12141 retains an identifier of a power saving control unit of an energized part of the storage device 1000.

The normal state power 12142, the slowdown state power 12143, and the suspended state power 12144 respectively retain power consumption values of respective operational states (hereinafter also referred to as states) to which a power saving control unit specified by the value of the power saving control unit 12141 transitions using the power saving function.

When an operational state other than those described above exists, a column for retaining power consumption values of the operational state is to be provided anew. Combinations of operational states may differ per power saving control unit 12141. For example, depending on the power saving control unit 12141, either only normal state power 12142 and suspended state power 12144 may be retained or a stand-by state power where there is no access but energization is performed and the like may be additionally retained.

The value of power consumption of each operational state is set to a maximum value of the power consumption in the state concerned. Alternatively, an average value or a minimum value shall suffice. As for a specific power consumption value, a value based on past results of power consumption of each power saving control unit may be used or a value already disclosed in catalog specifications or the like may be used.

Heretofore, various information to be stored by the main memory 1210 of the storage device 1000 has been described. Next, various information to be stored by the memory 2100 of the management server 2000 will be described.

FIG. 7 is a diagram showing a configuration example of volume management information 2112 stored in the memory 2100 of the management server 2000. Volume management information 2112 retains information indicating by which host server 3000 a logical volume of the storage device 1000 is being used.

The management server 2000 communicates with the host server 3000 and the storage device 1000 via the management network 4000, and acquires configuration information (not shown) of the host server 3000 and the device configuration information 1212 of the storage device 1000. Next, the management server 2000 acquires a logical volume identifier of the storage device 1000 used by the host server 3000 from the configuration information of the host server 3000. The management server 2000 collates RAID group allocation information described in the device configuration information 1212 of the storage device 1000 with the logical volume identifier, and creates volume management information 2112.

Volume management information 2112 retains storage information 21121, an RG number 21122, an LU number 21123, and mount information 21124.

Storage information 21121 retains an identifier of the storage device 1000.

The RG number 21122 retains an identifier of a RAID group 1111 of the storage device 1000 specified by the value of the storage information 21121.

The LU number 21123 retains an identifier of a logical volume corresponding to the value of the RG number 21122 acquired from the device configuration information 1212.

The mount information 21124 stores an identifier of the host server 3000 that is using the logical volume specified by the LU number 21123 and an identifier to be used when the logical volume is mounted by the host server 3000.

FIG. 8 is a diagram showing a configuration example of power consumption history log information 2113 stored in the memory 2100 of the management server 2000. The power consumption history log information 2113 retains past power consumption of the storage device 1000 per, for example, a predetermined time interval.

The management server 2000 connects to the storage device 1000 via the management network 4000, acquires data on past device power information 1213 via an appropriate interface, and stores the data per recording units of the device power information 1213 in the power consumption history log information 2113. It is assumed that power consumption history log information 2113 individually exists for each storage device 1000 to become a management object of the management server 2000.

Power consumption history log information 2113 retains an energized part 21131 and a measurement time 21132. Measurement time 21132 further retains a power consumption log 21133 and a state log 21134.

The energized part 21131 retains a value in which an identifier of the storage device 1000 is assigned to a value of the energized part 12131 of the device power information 1213.

Measurement time 21132 retains a measurement start time and a measurement end time of device power information 1213.

The power consumption log 21133 and the state log 21134 respectively retain, for each measurement time 21132, a value of the power consumption 12132 and the power state 12133 of the device power information 1213 which correspond to the energized part 21131.

The data example shown in FIG. 8 shows that a RAID group RG02 of a storage device 01 was in a normal operational state from 13:35 to 13:36 on Oct. 3, 2004, and had changed to a suspended state from 13:36 to 13:37 on the same day. Such information can be acquired from past device power information 1213.

FIG. 9 is a diagram showing a configuration example of power limitation information 2114 stored in the memory 2100 of the management server 2000. The power limitation information 2114 retains information for reserving and specifying an operational state of each energized part in a specific period in the future in order to limit the power consumption of the storage device 1000 during the period concerned. A procedure for creating power limitation information 2114 will be described later.

Power limitation information 2114 retains a scheduled time 21141, an energized part 21142, a past result power consumption 21143, a past result state 21144, a state transition schedule 21145, and a scheduled power reduction 21146.

The scheduled time 21141 retains a period, among a period for which an upper limit of the electric energy consumption is prescribed, in which an operational state of a power saving control unit is transitioned in accordance with a value of the state transition schedule 21145, to be described later, and the aforementioned state is maintained. It is convenient from a processing perspective if the time interval of the period is matched with, for example, the time interval of device power information 1213.

The energized part 21142 retains an identifier of an energized part to become a state transition object together with an identifier of the storage device 1000.

The past result power consumption 21143 retains an estimated value of power consumption of an energized part specified by the value of the energized part 21142, estimated from past power consumption of the aforementioned energized part (the energized part 21142), for the aforementioned period (the scheduled time 21141).

The past result state 21144 retains an operational state of the energized part 21142 at the time where the past result power consumption 21143 had been estimated.

The state transition schedule 21145 retains an operational state to which the energized part 21142 is scheduled to transition in the aforementioned period (the scheduled time 21141). The operational state after transition is limited by the state transition condition information 2115 and the state transition priority information 2116 to be described later.

The scheduled power reduction 21146 retains a value of power consumption that can be reduced as reckoned from the past result power consumption 21143 when changing the state of the energized part 21142 from the past result state 21144 to the state transition schedule 21145.

When the energized part 21142 is not a power saving control unit, it is assumed that "--" indicating no value is to be retained for the past result state 21144, the state transition schedule 21145, and the scheduled power reduction 21146.

The management server 2000 is to retain power limitation information 2114 per, for example, any of the time intervals (1) to (3) described below.

(1) The time interval between the measurement start time and the measurement end time of device power information 1213 during a period for which an upper limit of the electric energy consumption has been prescribed (2) The time interval at which the management server 2000 updates the power consumption history log information (3) The time interval at which a state transition of any of the power saving control units is scheduled.

The data example shown in FIG. 9 assumes a scene in which, as of Oct. 3, 2005, operation history of a year ago (Oct. 3, 2004) was acquired from the power consumption history log information 2113, and using the operation history as a template, today's operation schedule of the storage device 1000 is to be created as power limitation information 2114. The data example shown in FIG. 9 shows that a RAID group RG02 of the storage device 01 is scheduled to transition from a normal operational state to a slowdown operational state during 13:35 to 13:36 on Oct. 3, 2005, and that the scheduled power reduction due to the state transition is 130.

FIG. 10 is a diagram showing a configuration example of state transition condition information 2115 stored in the memory 2100 of the management server 2000. The state transition condition information 2115 retains information prescribing constrained conditions to be applied when each power saving control unit changes operational states.

The state transition condition information 2115 retains a power saving control unit 21151, a state after transition 21152, and a state transition condition 21153. The state transition condition 21153 further retains a scheduled excess electric energy limitation 21154 and a time limitation 21155.

The power saving control unit 21151 retains an identifier of a power saving control unit.

The state after transition 21152 retains respective operational states to which a power saving control unit specified by the value of the power saving control unit 21151 transitions using the power saving function. Moreover, when the state transition condition 21153 to be described next does not apply, the power saving control unit 21151 concerned is handled on the assumption that a transition is to be made to the normal operational state. Therefore, the state transition condition information 2115 need not retain a transition condition to the normal operational state.

The state transition condition 21153 retains a condition in which a power saving control unit specified by the value of the power saving control unit 21151 transitions to an operational state specified by the value of the state after transition 21152. It is assumed that the aforementioned power saving control unit transitions to the operational state concerned only when conditions of the scheduled excess electric energy limitation 21154 and the time limitation 21155 are both satisfied. When any of the conditions are not satisfied, a transition is made to the normal operational state.

An estimated excess portion of the electric energy consumption of the storage device 1000 is specified in the scheduled excess electric energy limitation 21154 as one of the conditions to be met for the aforementioned power saving control unit (the power saving control unit 21151) to transition to the aforementioned operational state (the state after transition 21152). When it is predicted that the excess portion of the electric energy consumption of the storage device 1000 is to reach the present value, there is a possibility that the storage device 1000 will transition to the operational state specified by the state after transition 21152. The value of the scheduled excess electric energy limitation 21154 is to be compared to the scheduled total electric energy information

2117 and the electric energy limitation information 2118, to be described later. A detailed description thereof will be presented later.

A date and time is specified in the time limitation 21155 as one of the conditions to be met for the aforementioned power saving control unit (the power saving control unit 21151) to transition to the aforementioned operational state (the state after transition 21152). At a time point where the date and time match the present value, there is a possibility that the storage device 1000 will transit to the operational state specified by the state after transition 21152. The value of the time limitation 21155 is to be compared to time management information 2119. It shall suffice that the time limitation 21155 specify a specific time slot within a period for which an upper limit of the electric energy consumption is prescribed.

The value set as the time limitation 21155 is assumed to be a value that specifies a specific time of day or a time slot within a period for which an upper limit of the electric energy consumption is prescribed. The present condition is applied when the scheduled time 21141 of the power limitation information 2114 matches the time of day or the time slot set as the time limitation 21155.

The state transition condition 21153 may alternatively be arranged so as to vary over time within a period for which an upper limit of the electric energy consumption is prescribed. In this case, the management server 2000 retains a plurality of pieces of state transition condition information 2115 for each piece of power limitation information 2114 with different scheduled times 21141.

A data example shown in FIG. 10 will be described in (1) and (2) below.

(1) The state after transition 21152 "slowdown" of the power saving control unit 21151 "RG03" has a scheduled excess power limitation 21153 of "0 or higher". In this case, the present condition is applied when the end-of-period excess electric energy scheduled value 21185, to be described later, reaches or exceeds 0. The present condition is not applied and RG03 operates in a normal state when the end-of-period excess electric energy scheduled value 21185 is below 0.

(2) The state after transition 21152 "suspended" of the power saving control unit 21151 "RG03" has a time limitation 21155 of "18:00 to 8:30". In this case, the present condition is applied between 18:00 and 8:30 every day during the aforementioned period. The present condition is not applied during other time slots and operation takes place in the normal state.

FIG. 11 is a diagram showing a configuration example of state transition priority information 2116 stored in the memory 2100 of the management server 2000. The state transition priority information 2116 retains information that prescribes priorities when a plurality of power saving states exists to which a power saving control unit can transition using a power saving function.

The state transition priority information 2116 retains a power saving control unit 21161, a state after transition 21162, and a priority 21163.

The power saving control unit 21161 retains an identifier of a power saving control unit of the storage device 1000.

The state after transition 21162 retains a value of the state after transition 21152 of state transition condition information 2115 corresponding to the value of the power saving control unit 21161.

When there is a plurality of power saving control units 21151 to which the state transition condition 21153 can be applied, the priority 21163 retains a weighting value that determines an order of power saving control units 21151 to be subjected to state transition. With the priority 21163, it is assumed that a minimum value of "1" represents a lowest priority and the larger the figure, the higher the priority. It is assumed that the higher the priority, the earlier the order in which a power saving control unit 21151 becomes a state transition object. The method of assigning values of priority 21163 is not limited to that described above. It is assumed that any value may be used as long as state transitions of a plurality of power saving control units can be ordered.

In addition, the priority 21163 may alternatively be arranged so as to vary over time within a period for which an upper limit of the electric energy consumption is prescribed. In this case, the management server 2000 retains a plurality of pieces of state transition priority information 2116 for each piece of power limitation information 2114 with different scheduled times 21141.

The data example shown in FIG. 11 shows that while the power saving control units RG01 to RG03 can respectively assume the two power saving states of the slowdown state and the suspended state, when all power saving control units shown in FIG. 11 satisfy both the scheduled excess electric energy limitation 21154 and the time limitation 21155, changing RG02 to the slowdown state is assigned the highest priority.

FIG. 12 is a diagram showing a configuration example of scheduled total electric energy information 2117 stored in the memory 2100 of the management server 2000. The scheduled total electric energy information 2117 retains, for a period for which an upper limit of the electric energy consumption is prescribed, information on a total electric energy consumption estimated based on past results. In addition, the scheduled total electric energy information 2117 also retains information on a total electric energy reduction of the aforementioned period in a case where it is assumed that power saving control units are controlled in accordance with power limitation information 2114. The scheduled total electric energy information 2117 is information created for determining whether or not the storage device 1000 can be operated within the prescribed upper limit of the electric energy consumption at an initial time point where power saving control of the storage device 1000 is started in the aforementioned period.

The scheduled total electric energy information 2117 retains a prescribed electric energy 21171, a scheduled total electric energy consumption 21172, a scheduled total electric energy reduction 21173, and a scheduled total excess electric energy 21174.

The prescribed electric energy 21171 retains a prescribed upper limit of electric energy consumption for the aforementioned period.

The scheduled total electric energy consumption 21172 retains an estimated value of the electric energy consumption of the storage device 1000 during the aforementioned period as estimated from past power consumption results of the storage device 1000.

The scheduled total electric energy reduction 21173 retains a summation of scheduled power reduction 21146 for the aforementioned period or, in other words, a total electric energy reduction for the aforementioned period in a case where it is assumed that power saving control units are controlled based on the power limitation information 2114.

The scheduled total excess electric energy 21174 retains a value obtained by subtracting the prescribed electric energy 21171 and the scheduled total electric energy reduction 21173 from the scheduled total power consumption 21172.

The data example shown in FIG. 12 shows that the prescribed upper limit of the electric energy consumption for the aforementioned period is 4000, and based on past results, the operation of the storage device 1000 increases the total electric energy consumption to 5000. In addition, it is also shown that the total electric energy consumption can be reduced by 600 by controlling the power saving control units in accordance with the power limitation information 2114.

FIG. 13 is a diagram showing a configuration example of electric energy limitation information 2118 stored in the memory 2100 of the management server 2000. Unlike the scheduled total electric energy information 2117 created at the initial time point of a period, the electric energy limitation information 2118 is created at each time point where the storage device 1000 is subjected to power saving control in order to confirm the balance between a summation of the electric energy consumption up to that time point and a summation of the scheduled electric energy reduction up to that time point.

The electric energy limitation information 2118 retains a current electric energy consumption scheduled value 21181, a current electric energy consumption 21182, a current excess electric energy 21183, an end-of-period electric energy reduction scheduled value 21184, and an end-of-period excess electric energy scheduled value 21185.

The current electric energy consumption scheduled value 21181 retains an estimated value of the electric energy consumption of the storage device 1000 from the starting time point to the current time point of the aforementioned period as estimated from past power consumption results of the storage device 1000.

The current electric energy consumption 21182 retains an actual value of the electric energy consumption of the storage device 1000 from the starting time point to the current time point of the aforementioned period.

The current excess electric energy 21183 retains a value that is the excess portion of the current electric energy consumption 21182 with respect to the current electric energy consumption scheduled value 21181.

The end-of-period electric energy reduction scheduled value 21184 retains a scheduled value of electric energy that can be reduced between the current time point and the end of the aforementioned period when it is assumed that the power saving control units are to be controlled in accordance with the power limitation information 2114 until the end of the aforementioned period.

The end-of-period excess electric energy scheduled value 21185 retains a value obtained by subtracting the end-of-period electric energy reduction scheduled value 21184 from the current excess electric energy 21183.

The data example shown in FIG. 13 shows that, based on past power consumption results of the storage device 1000, although the scheduled value of the electric energy consumption from the start of period to the current time point should be 2000 under normal circumstances, the actual electric energy consumption at the current time point is 2500. Therefore, the excess portion of the electric energy consumption at the current time point is 500. In addition, it is also shown that by subjecting the storage device 1000 to power saving control until the end of period in accordance with the power limitation information 2114, the electric energy can be reduced by a further 300 as compared to past results at the end of period. Therefore, it is also shown that by subjecting the storage device 1000 to power saving control until the end of period as-is in accordance with the power limitation information 2114, it is predicted that the electric energy consumption will exceed the prescribed upper limit by 200.

FIG. 14 is a diagram showing a configuration example of time management information 2119 stored in the memory 2100 of the management server 2000. Time management information 2119 retains information indicating a period for which a prescribed upper limit of the electric energy consumption has been set.

Time management information 2119 retains a current time 21191, a start time 21192, and an end time 21193.

The current time 21191 retains a date and time of the current time point.

The start time 21192 and the end time 21193 respectively retain a start time point and an end time point of a period for which a prescribed upper limit of the electric energy consumption has been set.

Heretofore, various information to be stored by the memory 2100 of the management server 2000 has been described.

In the present first embodiment, while it is assumed that the management server 2000 performs power saving control of the storage device 1000, the storage device 1000 itself may alternatively execute a role corresponding to the management server 2000.

For example, programs and various information stored in the memory 2100 of the management server 2000 may be stored in the main memory 1210 of the storage device 1000. In this case, if there are a plurality of storage devices 1000, it is assumed that various information stored in the memory 2100 of the management server 2000 is synchronized among the storage devices 1000, the same values are stored in all storage devices 1000, and each of the storage devices 1000 individually execute a role corresponding to the management server 2000. Alternatively, only any one of the plurality of storage devices 1000 may be arranged to retain programs and various information stored in the memory 2100 of the management server 2000, and individually execute a role corresponding to the management server 2000 to perform power saving control of the respective storage devices 1000.

Heretofore, a configuration of the storage system according to the present first embodiment has been described. Next, operations of the storage system according to the present first embodiment will be described.

(1. Operations During Initial Setting)

First, operations during initial setting of the storage system according to the present first embodiment will be described. Initial setting is performed in a state prior to the start of operation of the storage device 1000. Initial setting is performed in order to create a control schedule in which the electric energy consumption of the storage device 1000 is estimated so as to be kept within a prescribed upper limit. The control schedule is to be created as power limitation information 2114.

First, an outline of operations during initial setting will be described in steps (1.1) to (1.4) below, followed by a detailed description with reference to FIG. 15. Hereinafter, for convenience of description, the power control program 1211 and the power management program 2111 will be described as operating entities. However, it should be added that hardware to become actual operating entities is the CPU 1220 and the CPU 2200 which are operated in accordance with operations prescribed by the programs.

(1.1) Creating Volume Management Information 2112

The power management program 2111 of the management server 2000 collects configuration information of the host server 3000 and device configuration information 1212 of the storage device 1000 via the management network 4000. The power management program 2111 creates volume management information 2112 using this information.

(1.2) Updating Volume Management Information 2112

The power management program 2111 periodically updates the volume management information 2112 to keep it up to date. Alternatively, when the configuration information of the host server 3000 and device configuration information 1212 of the storage device 1000 are changed, the power management program 2111 may receive notifications of the aforementioned information and update the volume management information 2112 at such timings.

(1.3) Updating Device Configuration Information 1212 and Power Saving Control Unit Information 1214

The power control program 1211 of the storage device 1000 constantly keeps the device configuration information 1212 and power saving control unit information 1214 up to date in accordance with the configuration of the storage device 1000.

(1.4) Creating Power Limitation Information 2114

The power management program 2111 creates a schedule of state transitions of power saving control units of the storage device 1000 to be performed (power limitation information 2114) for a period in which an operation of the storage device 1000 is scheduled. The state transition schedule is created so as to limit the electric energy consumption for the aforementioned period within a prescribed upper limit while maintaining operations of an RG necessary for the storage device 1000 to provide services to the host server 3000.

Heretofore, an outline of operations during initial setting has been described. Hereinafter, details of operations during initial setting of the storage system according to the present first embodiment will be described.

Figure 15:
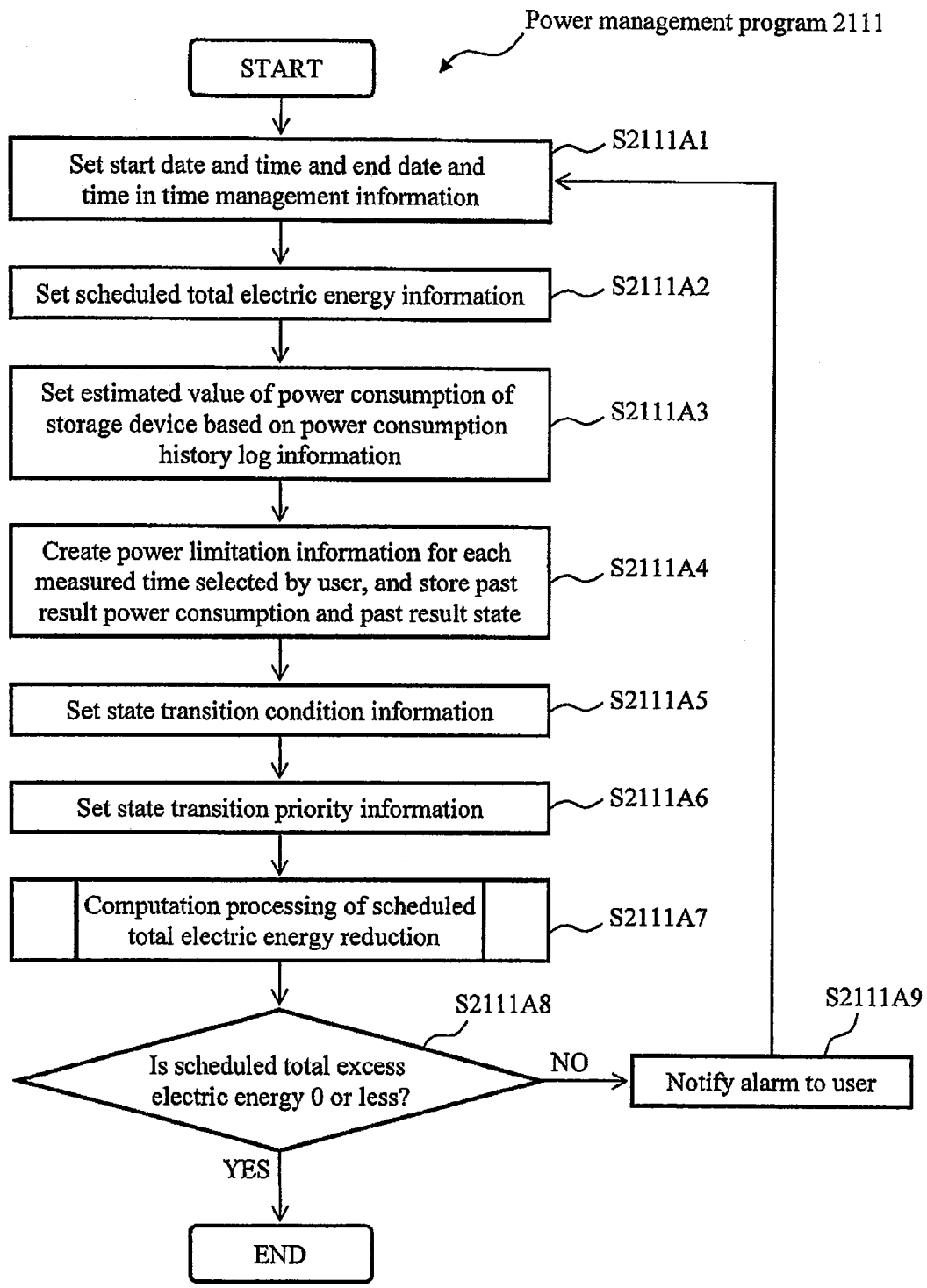
FIG. 15 is a processing flow performed by a power management program 2111 to create power limitation information 2114.

FIG. 15 is a processing flow performed by the power management program 2111 to create power limitation information 2114. Hereinafter, the respective steps shown in FIG. 15 will be described.

(FIG. 15: Step S2111A1)

A user uses the input unit 2300 to input a start date and time and an end date and time of a period for which an upper limit of the electric energy consumption is to be prescribed. The power management program 2111 stores the start date and time and the end date and time in the start time 21192 and the end time 21193 of time management information 2119.

(FIG. 15: Step S2111A2)

The user uses the input unit 2300 to input an upper limit value prescribing electric energy consumption within the period defined by the start date and time and an end date and time stored in step S2111A1. The power management program 2111 stores the upper limit value in the prescribed electric energy 21171 of the scheduled total electric energy information 2117. In addition, at this point, the power management program 2111 resets the values of the scheduled total electric energy consumption 21172, the scheduled total electric energy reduction 21173, and the scheduled total excess electric energy 21174 to "0".

(FIG. 15: Step S2111A3)

The power management program 2111 sets an estimated value of power consumption of the storage device 1000 for the aforementioned period using information on past power consumption and a past state of each energized part of the storage device 1000 stored in the power consumption history log information 2113. The following is conceivable as a specific processing examples of the present step.

(FIG. 15: Step S2111A3: Processing Example 1)

The power management program 2111 displays, for the user, power consumption history log information 2113 on the output unit 2400. The user sets an estimated value of the power consumption of the storage device 1000 for the aforementioned period using past power consumption results of the storage device 1000 as a template. For example, the user may select the measurement time 21132 in the power consumption history log information 2113 corresponding to a year ago from the current date and time, copy the past result value thereof, and rewrite only the date and time to the current date and time. Alternatively, the power management program 2111 may automatically copy a past result value, rewrite only the date and time to the current date and time, and use the rewritten value as an estimated value.

(FIG. 15: Step S2111A3: Processing Example 2)

The power management program 2111 displays power consumption history log information 2113 having the same time interval as the time interval between the start time 21192 and the end time 21193 to the user. The user selects a period with a similar configuration to the aforementioned period in which the storage device 1000 had been operational for which access to the storage device 1000 is predicted at a similar level. The power management program 2111 accepts the selection result.

(FIG. 15: Step S2111A3: Supplemental 1)

It is assumed that the period of power consumption history log information 2113 to be selected by the user need not necessarily be consecutive. For example, power consumption history log information 2113 whose start time, end time and year are different but the month, week, day, time slot or the like are the same may be displayed and selected.

(FIG. 15: Step S2111A3: Supplemental 2)

The power management program 2111 may store capability information such as access amount, number of accesses or the like of each RAID group 1111 in the power consumption history log information 2113, whereby a transition of the access amount is to be displayed together when displaying the power consumption history log information 2113 to allow selection by the user.

(FIG. 15: Step S2111A3: Supplemental 3)

The host server 3000 may store information such as a running time, number of logins, number of accesses, data transfer volume and the like of a business application that uses a logical volume on the RAID group 1111 for each time period, whereby the power management program 2111 may use such information. For example, the power management program 2111 may collect the information described above and display the same together with the power consumption history log information 2113, and allow selection by the user.

(FIG. 15: Step S2111A3: Supplemental 4)

The power management program 2111 may display all power consumption history log information 2113 and have the user make a selection. Moreover, the processing examples 1 and 2 and the supplementals 1 to 4 may be arbitrarily combined.

(FIG. 15: Step S2111A3: Supplemental 5)

When the configuration of the storage device 1000 has been changed from the time point at which the power consumption history log information 2113 had been acquired, if there is power consumption history log information 2113 during which the host server 3000 had accessed a storage device 1000 with a similar configuration to the storage device 1000 after the change, such power consumption history log information 2113 may be referenced instead. Alternatively, various configurations of the storage device 1000, as well as states in which various applications running on the host server 3000 use the storage device 1000, may be assumed in advance to prepare one or more templates of power consumption history log information 2113, whereby the template or templates may be referenced instead.

(FIG. 15: Step S2111A4)

The power management program 2111 prepares power limitation information 2114 for each measurement time 21132 of the power consumption history log information 2113 selected by the user in step S2111A3. Details of the present step will be supplemented below.

(FIG. 15: Step S2111A4: Supplemental 1)

The power management program 2111 rewrites the measurement time 21132 of the power consumption history log information 2113 selected by the user to the date and time of the period for which electric energy consumption is to be prescribed, and stores it in the scheduled time 21141 of the power limitation information 2114. For example, if the aforementioned period is from Mar. 1, 2005 to Mar. 31, 2005 and the user had specified a measurement period of March 2002, only the year information is rewritten from 2002 to 2005 and stored.

(FIG. 15: Step S2111A4: Supplemental 2)

The power management program 2111 stores the energized part 21131 of the power consumption history log information 2113 in the energized part 21142 of the power limitation information 2114. In addition, the power management program 2111 stores the power consumption log 21133 and the state log 21134 of the energized part 21131 concerned in the past result power consumption 21143 and the past result state 21144 of the corresponding energized part 21142. When the state log 21134 is "none", "—" indicating no value is to be stored in the past result state 21144. The present step is to be executed for each measurement time 21132 of the power consumption history log information 2113 selected by the user in step S2111A3.

(FIG. 15: Step S2111A4: Supplemental 3)

When there is no power consumption history log information 2113 in steps S2111A3 to S2111A4, the respective fields are to be set as follows.

(1) Scheduled time 21141: This value is set for each time interval at which power consumption of the storage device 1000 is to be measured for a period for which electric energy consumption is to be prescribed.

(2) Past result power consumption 21143: The value of the normal state power 12142 of the power saving control unit information 1214 is used. As for a specific value, power consumption determined in advance in catalog specifications or the like for each energized part 21142 may be used. Alternatively, usage or access frequency may be tentatively set for each RG, whereby power consumption may be calculated based on the set information from specifications of physical disks that make up the RG.

(3) Past result state 21144: "Normal" is set.

(FIG. 15: Step S2111A4: Supplemental 4)

When the energized part 22142 does not match the power saving control unit 12141 of the power saving control unit information 1214, the past result state 21144 is set to "—" indicating no value.

(FIG. 15: Step S2111A5)

The power management program 2111 sets a state transition condition 21153 for power saving control units of the storage device 1000 that is currently operational to be performed in a period for which an upper limit of the electric energy consumption is prescribed. Details of the present step will be supplemented below.

(FIG. 15: Step S2111A5: First Step)

The power management program 2111 references the power saving control unit information 1214 and displays, for the user, power saving control units 12141 of the storage device 1000 and the respective states to which the power saving control units 12141 concerned can transition.

(FIG. 15: Step S2111A5: Second Step)

The user sets a scheduled excess electric energy limitation 21154 and a time limitation 21155 of the state transition condition information 2115 for each state of each power saving control unit. The power management program 2111 stores the setting result in the state transition condition information 2115. When the state transition condition 21153 is set to "No state transition", it is assumed that the condition concerned is not applied.

(FIG. 15: Step S2111A5: Supplemental 1)

The value set for the scheduled excess electric energy limitation 21154 is to be a value of an excess portion from the prescribed upper limit that is predicted to be irreducible even when state transitions of the power saving control units scheduled within the remainder of the aforementioned period are to be performed. In other words, the value to be set as the scheduled excess electric energy limitation 21154 has a similar significance as the scheduled total excess electric energy 21174 or the end-of-period excess electric energy scheduled value 21185.

(FIG. 15: Step S2111A5: Supplemental 2)

In addition to being specified by the user, the value of the time limitation 21155 may be automatically set by the power management program 2111. For example, the power management program 2111 may communicate with the host server 3000 and the storage device 1000 to collect information such as access frequencies to the power saving control units. Based on the information and the volume configuration management information 2112, the power management program 2111 may set a time slot with heavy usage such as access to the power saving control units as the time limitation 21155.

For example, when a job execution time of an application on a host server B that uses LU 03 on RG 03 has been reserved, the power management program 2111 may acquire the aforementioned reservation information and store the execution time of the aforementioned job in the time limitation 21155 of RG 03 among the power saving control units 21151.

(FIG. 15: Step S2111A5: Supplemental 3)

While the state transition condition 21153 has been described as being configured as a combination of the scheduled excess electric energy limitation 21154 and the time limitation 21155, such a configuration is not restrictive. For example, values such as the presence/absence of accesses to the power saving control unit 21151, access amount, number of accesses, or the like may be used as the state transition condition 21153. In addition, the date and time at which data is migrated from a spare disk during recovery of a physical disk from a failure, or a usage of a power saving control unit such as verification for the purpose of data maintenance of a physical disk may be used as the state transition condition 21153.

(FIG. 15: Step S2111A5: Summary of Supplementals 2 and 3)

As described above in supplementals 2 and 3, the state transition condition 21153 may be set by the user or may be automatically set by the power management program 2111 by collecting information on scheduled usage of the power saving control units by the host server 3000 and the storage device 1000.

(FIG. 15: Step S2111A5: Supplemental 4)

The power management program 2111 may conjunctionally store past state transition condition information 2115 as the power consumption history log information 2113, and store the same together with the power consumption history log information 2113 selected in step S2111A4 in the state transition condition information 2115. Moreover, the supplementals 1 to 4 may be arbitrarily combined.

(FIG. 15: Step S2111A6)

When there are a plurality of power saving control units to which the state transition condition 21153 may be applied and the condition becomes applicable to the plurality of power saving control units at the same timing, the power management program 2111 sets a priority for determining an order in which state transitions are to be performed. Details of the present step will be supplemented below.

(FIG. 15: Step S2111A6: First Step)

The power management program 2111 displays, for the user, respective states after transition 21152 for each power saving control unit 21151 of the state transition condition information 2115.

(FIG. 15: Step S2111A6: Second Step)

The user sets a priority for each combination of the state transition condition 21153. The power management program 2111 receives the results thereof and stores the same in the state transition priority information 2116.

(FIG. 15: Step S2111A6: Supplemental)

Besides being set by the user, the state transition priority information 2116 may be set by the power management program 2111 based on presence/absence of access, access amount, number of accesses, frequency of access or the like to a power saving control unit by communicating with the host server 3000 and the storage device 1000 and referencing capability information, statistical information, history logs and the like. For example, a low priority may be set for a power saving control unit that is frequently accessed and a high priority may be set for a power saving control unit that is infrequently accessed.

(FIG. 15: Step S2111A7)

The power management program 2111 performs calculation processing of the scheduled total electric energy reduction 21173. Details of the present step will be described later with reference to FIG. 16. As a result of the present step, when assuming that each power saving control unit has performed a state transition in accordance with the state transition condition 21153, an estimated value of the electric energy consumption of the storage device 1000 is to be stored in the scheduled total power consumption 21172, electric energy predicted to be reducible is to be stored in the scheduled total electric energy reduction 21173, and electric energy predicted to exceed a prescribed upper limit is to be stored in the scheduled total excess electric energy 21174.

(FIG. 15: Step S2111A8)

The power management program 2111 judges whether the electric energy consumption of the storage device 1000 will stay within the prescribed upper limit when performing scheduled state transitions of power saving control units in a period for which the upper limit of the electric energy consumption is prescribed.

Specifically, when the scheduled total excess electric energy 21174 of the scheduled total electric energy information 2117 is equal to or less than 0, the power management program 2111 judges that an operation of the storage device 1000 is possible within the prescribed electric energy and terminates the present flow. When the scheduled total excess electric energy 21174 is greater than 0, it is judged that an operation of the storage device 1000 is not possible within the prescribed upper limit and the processing of step S2111A9 is performed.

(FIG. 15: Step S2111A9)

The power management program 2111 displays the scheduled total electric energy information 2117 to the user, and notifies a warning to the user to the effect that the operation of the storage device 1000 is not possible within the upper limit prescribed in advance. Furthermore, the power management program 2111 notifies the user to the effect that a change to the scheduled prescribed upper limit or a change to the state transition condition 21153 of the power saving control unit is necessary. Upon conclusion of the present step, the flow returns to step S2111A1. Moreover, in the present step, the electric energy consumption may be displayed converted into an electric power charge set by a data center provider or the like.

Figure 16:
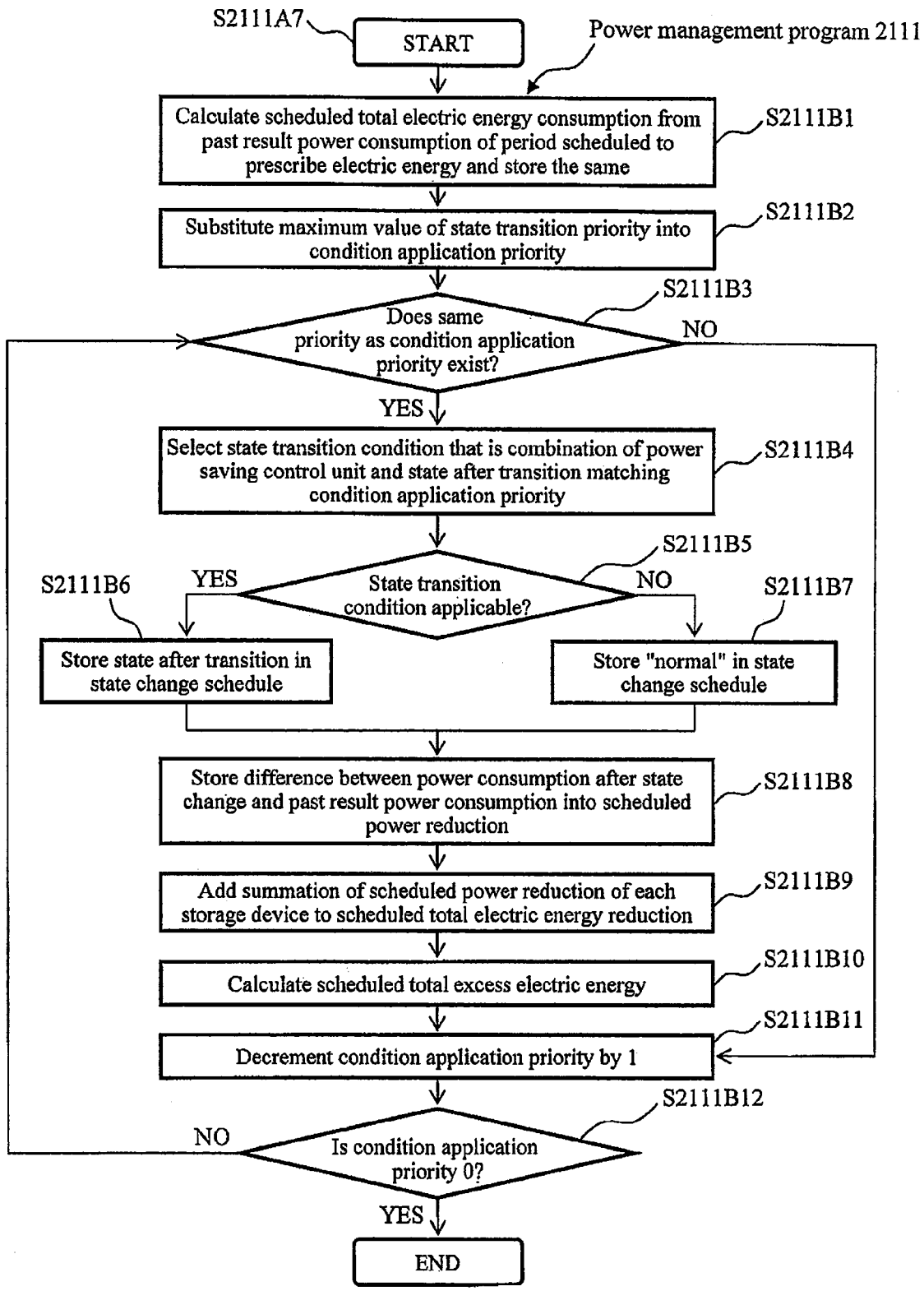
FIG. 16 is a diagram showing details of step S2111A7 shown in FIG. 15.

FIG. 16 is a diagram showing details of step S2111A7 shown in FIG. 15. Hereinafter, the respective steps shown in FIG. 16 will be described.

(FIG. 16: Step S2111B1)

The power management program 2111 acquires power limitation information 2114 storing a value of a relevant scheduled time 21141 during the period from the start time 21192 to the end time 21193 of the time management information 2119. Next, for each piece of power limitation information 2114, the power management program 2111 calculates electric energy consumption by multiplying a power consumption of each storage device 1000 stored in the past result power consumption 21143 by a time width of the scheduled time 21141, adds the calculated electric energy consumption to the scheduled total electric energy consumption 21172 of the scheduled total electric energy information 2117, and stores the same.

(FIG. 16: Step S2111B2)

The power management program 2111 references the state transition priority information 2116, and stores the maximum value among the priorities 21163 as the value of a condition application priority. In subsequent steps, a power saving control unit 21161 having the same priority 21163 as the condition application priority and a state after transition 21162 thereof are to be judgment objects regarding whether the state transition condition 21153 can be applied or not. The significance of the present step and step S2111B11 is that whether or not state transitions are to be performed is judged according to a descending order of priorities 21163.

(FIG. 16: Step S2111B3)

The power management program 2111 judges whether or not a priority 21183 having the same value as the condition application priority exists within the state transition priority information 2116. If so, the flow proceeds to step S2111B4, and if not, the flow proceeds to step S2111B11.

(FIG. 16: Step S2111B4)

The power management program 2111 identifies a combination of a power saving control unit 21161 and a state after transition 21162 corresponding to the priority 21163 that is equal to the current condition application priority. Next, the power management program 2111 identifies a combination of a power saving control unit 21151 and a state after transition 21152 matching the aforementioned combination, and selects a state transition condition 21153 corresponding to the combination. If the value of the priority 21163 is the same, a plurality of state transition conditions 21153 is to be selected.

(FIG. 16: Supplemental of Steps S2111B5 to S2111B10)

While the depiction of a loop has been omitted in FIG. 16 for convenience of description, starting from the start time 21192 to the end time 21193 of time management information 2119, the power management program 2111 repeats the series of processing from step S2111B5 to step S2111B10 in an order from the earliest to the latest among scheduled times 21141 in the power limitation information 2114. Moreover, when the priority 21163 changes with time during the aforementioned period, steps S2111B3 and S2111B4 are also to be repeated for each piece of power limitation information 21141.

(FIG. 16: Step S2111B5)

The power management program 2111 judges whether or not the scheduled time 21141 of the aforementioned power limitation information 2114 matches the time limitation 21155 selected in step S2111B4. Furthermore, the power management program 2111 judges whether or not the scheduled total excess electric energy 21174 of the scheduled total electric energy information 2117 matches the scheduled excess electric energy limitation 21154 selected in step S2111B4. The flow proceeds to step S2111B6 when conditions of both the scheduled excess electric energy limitation 21154 and the time limitation 21155 are satisfied, and to step S2111B7 when at least one of the conditions is not satisfied.

(FIG. 16: Step S2111B6)

The power management program 2111 stores, in the state transition schedule 21145, a value of a state after transition 21152 corresponding to the state transition condition 21153 judged in step S2111B5.

(FIG. 16: Step S2111B7)

The power management program 2111 stores "normal" in the state transition schedule 21145. However, when the past result state 21144 is "—" indicating no value, "—" indicating no value is similarly stored in the state transition schedule 21145 and the scheduled power reduction 21146.

(FIG. 16: Step S2111B8: First Step)

The power management program 2111 identifies an energized part 21142 and a state transition schedule 21145 by which whether or not to apply the state transition condition had been determined in step S2111B5.

(FIG. 16: Step S2111B8: Second Step)

Next, the power management program 2111 selects a power saving control unit 12141 of power saving control unit information 1214 and a value of power consumption of the operational state thereof (any of normal state power 12142, slowdown state power 12143, and suspended state power 12144) which match the energized part 21142 and the state transition schedule 21145.

(FIG. 16: Step S2111B8: Third Step)

Next, the power management program 2111 stores a value obtained by subtracting the value of power consumption selected in the aforementioned second step (any of normal state power 12142, slowdown state power 12143, and suspended state power 12144) from the value of past result power consumption 21143 in the scheduled power reduction 21146. When the value of past result power consumption 21143 decreases due to performing a state transition, the scheduled power reduction 21146 takes a positive value, and when the value of past result power consumption 21143 increases, a negative value is taken. When the state transition schedule 21145 is "--" indicating no value, the scheduled power reduction 21146 also takes "--" indicating no value.

(FIG. 16: Step S2111B9)

The power management program 2111 calculates electric energy reduction by multiplying the scheduled power reduction 21146 of the power limitation information 2114 by a time width of the scheduled time 21141, calculates a summation for each storage device 1000, adds it to the scheduled total electric energy reduction 21173 of the scheduled total electric energy information 2117, and stores it.

(FIG. 16: Step S2111B10)

The power management program 2111 stores a value obtained by subtracting the prescribed electric energy 21171 and the scheduled total electric energy reduction 21173 from the scheduled total electric energy consumption 21172 of the scheduled total electric energy information 2117 in the scheduled total excess electric energy 21174.

(FIG. 16: Step S2111B11)

The power management program 2111 decrements the value of the condition application priority by 1.

(FIG. 16: Step S2111B12)

The power management program 2111 judges whether the value of the condition application priority is 0 or not. When the condition application priority is greater than 0, the flow returns to step S2111B3. When the value of the condition application priority is 0, the present processing flow is concluded. When the condition application priority is equal to or below 0, an error is returned.

(2. Operations of Storage Device 1000 During System Operation)

Next, operations during system operation of the storage system according to the present first embodiment will be described. Operations during system operation refer to operations performed during operation of the storage device 1000 in a period for which an upper limit of the electric energy consumption has been prescribed. First, an outline of operations during system operation will be described in steps (2.1) and (2.2), followed by a detailed description thereof.

(2.1) Measuring Power Consumption

The power control program 1211 of the storage device 1000 constantly measures a current power consumption of an energized part of the storage device 1000, and constantly monitors the state of the energized part. The power control program 1211 stores the latest information on power consumption in the power consumption 12132 of the device power information 1213, and stores a latest state of the energized part 12131 concerned in the power state 12133. Furthermore, the power control program 1211 assigns times of measurement start and measurement end of power consumption to the device power information 1213.

(2.2) Initializing Electric Energy Limitation Information 2118

The power management program 2111 of the management server 2000 constantly updates the current time to be stored in current time 21191 of the time management information 2119 to the latest current time. Moreover, it is assumed that the power management program 2111 of the management server 2000 resets the respective values of the electric energy limitation information 2118 to "0" before the current time 21191 of the time management information 2119 assumes the same date and time as the start time 21192 or, in other words, before the storage device 1000 starts operations for a period for which an upper limit of the electric energy consumption has been prescribed.

Figure 17:
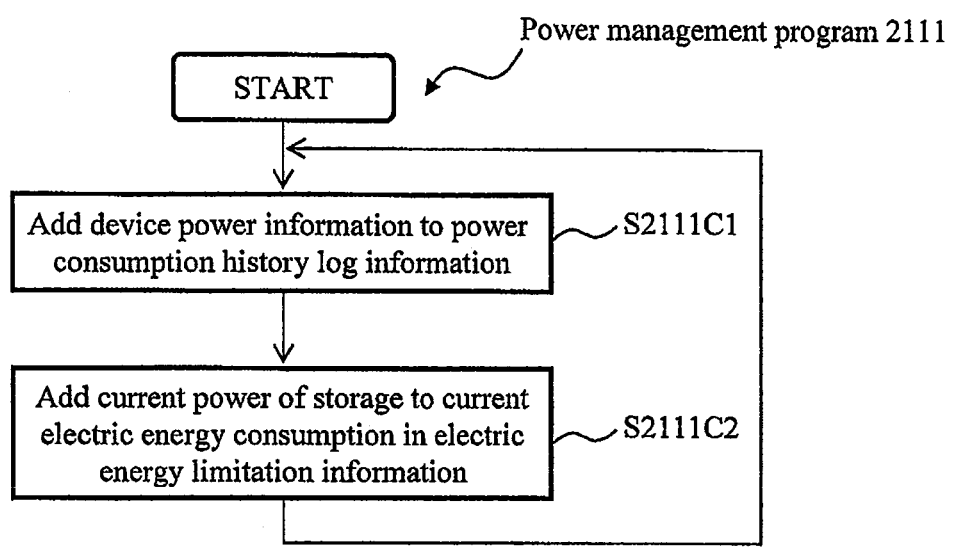
FIG. 17 is a diagram showing a processing flow performed by the power management program 2111 to collect current power consumption of the storage device 1000 during a period for which electric energy consumption is prescribed.

FIG. 17 is a diagram showing a processing flow performed by the power management program 2111 of the management server 2000 to collect current power consumption of the storage device 1000 during a period for which electric energy consumption is prescribed. Hereinafter, the respective steps shown in FIG. 17 will be described.

(FIG. 17: Step S2111C1)

The power management program 2111 collects device power information 1213 of the storage device 1000 via the management network 4000, and adds the same to power consumption history log information 2113. In addition, the power management program 2111 stores the start time and the end time of measurement of the power consumption attached to the device power information 1213 in the measurement time 21132.

The timings at which the power management program 2111 collects device power information 1213 from the storage device 1000 are, for example, each time interval of power consumption measurement of the storage device 1000. Alternatively, the power control program 1211 of the storage device 1000 may notify device power information 1213 to the power management program 2111 of the management server 2000 upon a change in the information in the device power information 1213.

(FIG. 17: Step S2111C2)

The power management program 2111 calculates electric energy consumption by multiplying the power consumption of each storage device 1000 retained in the power consumption log 21133 added to the power consumption history log information 2113 in step S2111B1 by the time width of the power consumption history log information 2113. The power management program 2111 adds the electric energy consumption to the current electric energy consumption 21182 of the electric energy limitation information 2118. After concluding the present step, the power management program 2111 returns to step S2111C1 and repeats the same processing.

Figure 18:
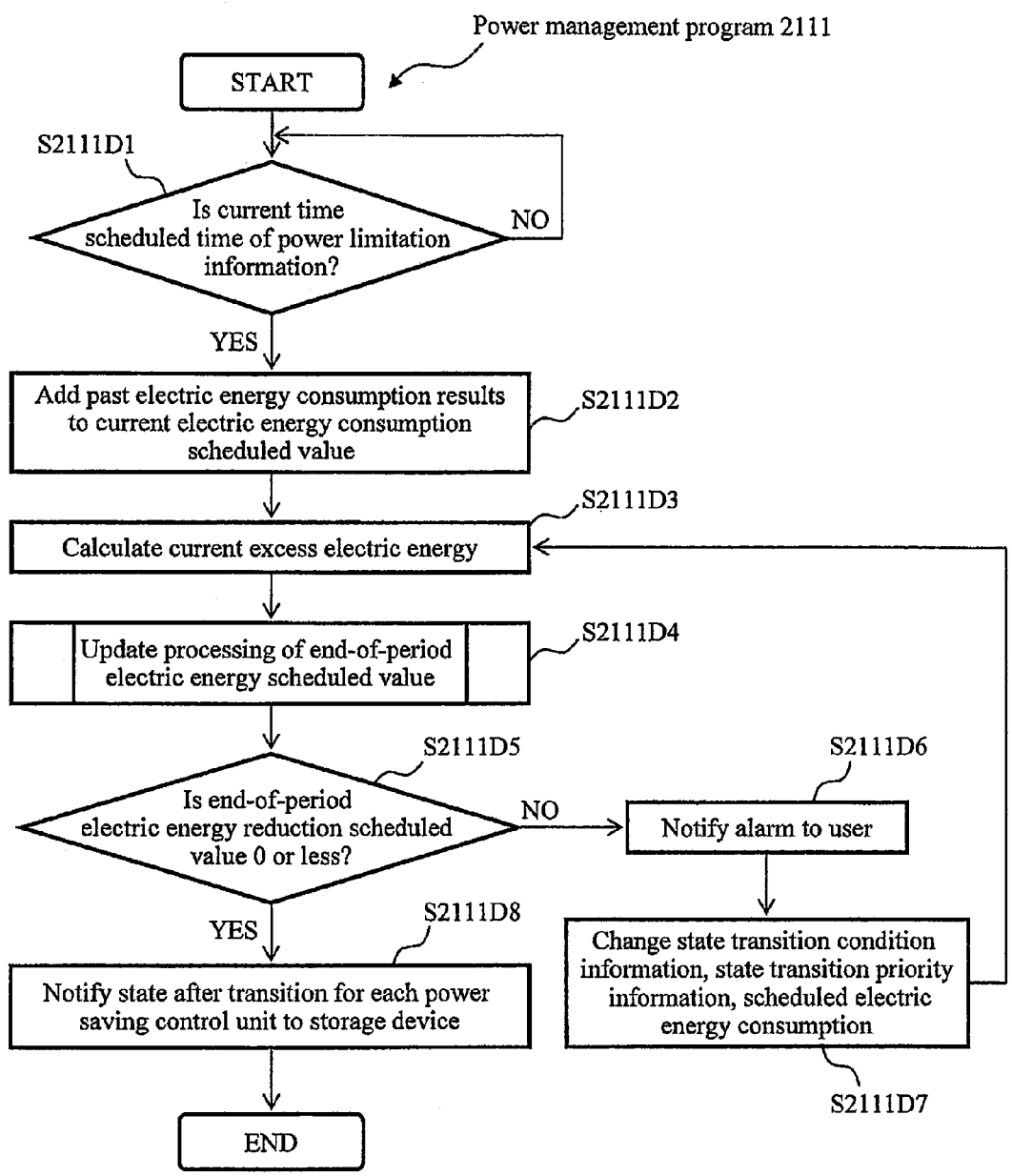
FIG. 18 is a processing flow performed by the power management program 2111 to perform power saving control of the storage device 1000 according to power limitation information 2114.

FIG. 18 is a processing flow performed by the power management program 2111 to perform power saving control of the storage device 1000 according to power limitation information 2114 and to update the power limitation information 2114 as required. Hereinafter, the respective steps shown in FIG. 18 will be described.

(FIG. 18: Step S2111D1)

The power management program 2111 references the current time 21191 of the time management information 2119, and judges whether or not the current time 21191 matches the scheduled time 21141 of the power limitation information 2114. If not, the present step is repeated until the two times match. If the two times match, the flow proceeds to step S2111D2.

(FIG. 18: Step S2111D2)

The power management program 2111 stores, among the electric energy consumption of the storage device 1000 scheduled in the initial setting, a scheduled portion which was to be consumed from the start of the period for which an upper limit of the electric energy consumption had been prescribed to the current time in the current electric energy consumption scheduled value 21181 of the electric energy limitation information 2118.

Specifically, the power management program 2111 calculates electric energy consumption by multiplying a past result power consumption 22143 corresponding to the scheduled time 21141 that had matched the current time 21191 in step S2111D1 by a time width of the scheduled time 21141, and adds the calculated electric energy consumption to the current electric energy consumption scheduled value 21181 for each storage device 1000. Accordingly, a scheduled electric energy consumption that should have been consumed from the start of the aforementioned period to the current time by each storage device 1000 is obtained.

(FIG. 18: Step S2111D3)

The power management program 2111 stores a value obtained by subtracting the current electric energy consumption scheduled value 21181 from the current electric energy consumption 21182 in the current excess electric energy 21183 of the electric energy limitation information 2118.

(FIG. 18: Step S2111D4)

The power management program 2111 performs update processing of the end-of-period electric energy reduction scheduled value 21184. In the present step, the state after transition of the power limitation information 2114 that is set during initial setting is changed according to the actual electric energy consumption of the storage device 1000 currently in operation. In other words, when the actual electric energy consumption of the storage device 1000 is greater than the schedule set during initial setting, since the operation of the storage device 1000 cannot be performed at or below the prescribed upper limit of the electric energy consumption even when the present operation is continued as-is, a future state transition schedule is to be reset.

As a result of the present step, the state transition schedule 21145 and the scheduled power reduction 21146 of the power limitation information 2114 from the current time to the end of the period for which the upper limit of the electric energy consumption has been prescribed are changed in correspondence with the electric energy consumption of the storage device 1000 from the start of the aforementioned period to the current time. In addition, electric energy reducible when assuming that power saving control units of the storage device 1000 are subjected to state transition according to the power limitation information 2114 from the current time to the end of the period for which the upper limit of the electric energy consumption has been prescribed is stored in the end-of-period electric energy reduction scheduled value 21184. Furthermore, a value obtained by subtracting the end-of-period electric energy reduction scheduled value 21184 from the current excess electric energy 21183 is stored in the end-of-period excess electric energy scheduled value 21185.

Details of the present step will be described later with reference to FIG. 19.

(FIG. 18: Step S2111D5)

The power management program 2111 judges whether the electric energy consumption of the storage device 1000 will stay within the prescribed upper limit when performing state transitions of power saving control units according to the power limitation information 2114 from the current time point to the end of the period for which the upper limit of the electric energy consumption is prescribed.

Specifically, the power management program 2111 judges whether or not the end-of-period excess electric energy scheduled value 21185 of the electric energy limitation information 2118 is at or below 0. If so, it is judged that the storage device 1000 can be operated within the prescribed upper limit and the flow proceeds to step S2111D8. If the value is greater than 0, it is judged that the storage device 1000 cannot be operated within the prescribed upper limit, and the flow proceeds to step S2111D6.

(FIG. 18: Step S2111D6)

The power management program 2111 displays the electric energy limitation information 2118 to the user, and notifies a warning to the effect that the operation of the storage device 1000 is not possible within the prescribed upper limit electric energy. In addition, the power management program 2111 notifies the user to the effect that a change to the prescribed upper limit electric energy or a change to the state transition condition 21153 of the power saving control unit to be selected is necessary. Moreover, in the present step, the electric energy consumption may be displayed converted into an electric power charge set by the data center provider or the like.

(FIG. 18: Step S2111D7)

The user performs a change input on at least any of the prescribed upper limit electric energy, the state transition condition 21153 of the power saving control unit, and the priority 21163. The power management program 2111 receives the change input and changes the current electric energy consumption scheduled value 21181, the state transition condition 21153, or the priority 21163 of the state transition priority information 2116. After concluding the present step, the power management program 2111 returns to step S2111D3 and repeats the same processing.

(FIG. 18: Step S2111D8)

The power management program 2111 references power limitation information 2114 whose scheduled time 21141 matches the current time 21191. Next, the power management program 2111 notifies a combination of an energized part 21142 and a state transition schedule 21145 of the power limitation information 2114 to the power control program 1211 of the storage device 1000. However, a notification is unnecessary when the value of the state transition schedule 21145 is "--". Upon receiving the aforementioned notification, the power control program 1211 of the storage device 1000 performs state transition processing of the power saving control unit, to be described later.

Figure 19:
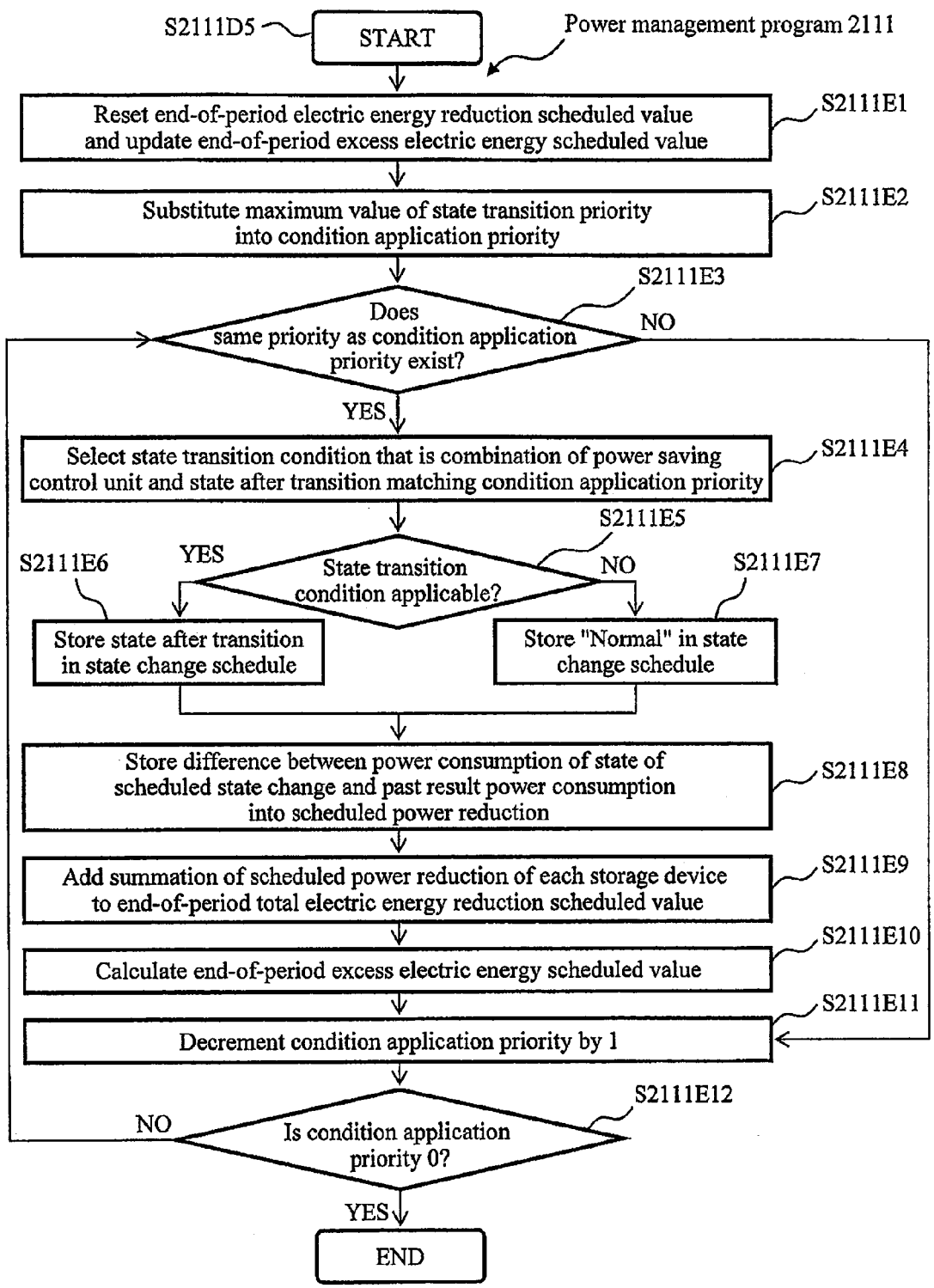
FIG. 19 is a diagram showing details of step S2111D4 shown in FIG. 18.

FIG. 19 is a diagram showing details of step S2111D4 shown in FIG. 18. Hereinafter, the respective steps shown in FIG. 19 will be described.

(FIG. 19: Step S2111E1)

The power management program 2111 resets the end-of-period electric energy reduction scheduled value 21184 of the electric energy limitation information 2118 to "0", and stores the value of the current excess electric energy 21183 in the end-of-period excess electric energy scheduled value 21185.

(FIG. 19: Step S2111E2)

The power management program 2111 references the state transition priority information 2116, and stores the maximum value among the priorities 21163 as a condition application priority.

(FIG. 19: Step S2111E3)

The power management program 2111 judges whether or not a priority 21163 having the same value as the condition application priority exists within the state transition priority information 2116. If not, the flow proceeds to step S2111E11, and if so, the flow proceeds to step S2111E4.

(FIG. 19: Step S2111E4)

The power management program 2111 identifies a combination of a power saving control unit 21161 and a state after transition 21162 corresponding to the priority 21163 that is equal to the current condition application priority. Next, the power management program 2111 identifies a combination of a power saving control unit 21151 and a state after transition 21152 matching the aforementioned combination, and selects a state transition condition 21153 corresponding to the combination. If the value of the priority 21163 is the same, a plurality of state transition conditions 21153 is to be selected.

(FIG. 19: Supplemental of Steps S2111E5 to S2111E10)

While the depiction of a loop has been omitted in FIG. 19 for convenience of description, starting from the current time 21191 to the end time 21193 of time management information 2119, the power management program 2111 repeats the series of processing from step S2111E5 to step S2111E10 in an order from the earliest to the latest among scheduled times 21141 in the power limitation information 2114.

(FIG. 19: Step S2111E5)

The power management program 2111 judges whether or not the scheduled time 21141 of the aforementioned power limitation information 2114 matches the time limitation 21155 selected in step S2111E4. Furthermore, the power management program 2111 judges whether or not the end-of-period excess electric energy scheduled value 21185 of the electric energy limitation information 2118 matches the scheduled excess electric energy limitation 21154 selected in step S2111E4. The flow proceeds to step S2111E6 when conditions of both the scheduled excess electric energy limitation 21154 and the time limitation 21155 are satisfied, and to step S2111E7 when at least one of the conditions is not satisfied.

(FIG. 19: Step S2111E6)

The power management program 2111 stores, in the state transition schedule 21145, a value of a state after transition 21152 of the state transition condition 21153 on which a judgment on whether or not to be applied had been made in step S2111E5.

(FIG. 19: Step S2111E7)

The power management program 2111 stores "normal" in the state transition schedule 21145. However, when the past result state 21144 is "--" indicating no value, "--" indicating no value is similarly stored in the state transition schedule 21145 and the scheduled power reduction 21146.

(FIG. 19: Step S2111E8: first step)

The power management program 2111 identifies an energized part 21142 and a state transition schedule 21145 by which whether or not to apply the state transition condition had been determined in step S2111E5.

(FIG. 19: Step S2111E8: Second Step)

Next, the power management program 2111 selects a power saving control unit 12141 of power saving control unit information 1214 and a value of power consumption of the operational state thereof (any of normal state power 12142, slowdown state power 12143, and suspended state power 12144) which match the energized part 21142 and the state transition schedule 21145.

(FIG. 19: Step S2111E8: Third Step)

Next, the power management program 2111 stores a value obtained by subtracting the value of power consumption selected in the aforementioned second step (any of normal state power 12142, slowdown state power 12143, and suspended state power 12144) from the value of past result power consumption 21143 in the scheduled power reduction 21146. When the value of past result power consumption 21143 decreases due to performing a state transition, the scheduled power reduction 21146 takes a positive value, and when the value of past result power consumption 21143 increases, a negative value is taken. When the state transition schedule 21145 is "--" indicating no value, the scheduled power reduction 21146 also takes "--" indicating no value.

(FIG. 19: Step S2111E9)

The power management program 2111 calculates electric energy reduction by multiplying the scheduled power reduction 21146 of the power limitation information 2114 by a time width of the scheduled time 21141, calculates a summation for each storage device 1000, adds the same to the end-of-period total electric energy reduction scheduled value 21184 of the electric energy limitation information 2118, and stores the same.

(FIG. 19: Step S2111E10)

The power management program 2111 stores a value obtained by subtracting the end-of-period electric energy reduction scheduled value 21184 from the current excess electric energy 21183 of the electric energy limitation information 2118 in the end-of-period excess electric energy scheduled value 21185.

(FIG. 19: Step S2111E11)

The power management program 2111 decrements the value of the condition application priority by 1.

(FIG. 19: Step S2111E12)

The power management program 2111 judges whether the value of the condition application priority is 0 or not. When the condition application priority is greater than 0, the flow returns to step S2111E3. When the value of the condition application priority is 0, the present processing flow is concluded. When the condition application priority is equal to or below 0, an error is returned.

Heretofore, operations of the management server 2000 have been described. Next, processing by the power control program 1211 of the storage device 1000 for performing state transitions in power saving control units will be described.

The present processing is started upon a reception by the power control program 1211 of the storage device 1000 in step S2111D8 of a notification of a combination of a power saving control unit and a state after transition from the power management program 2111 of the management server 2000.

The power control program 1211 of the storage device 1000 changes the notified power saving control unit to the state specified by the state after transition. When the state after transition is the same as the state prior to change, no change is made.

Heretofore, operations of the storage system according to the present first embodiment during system operation has been described.

As described above, in the storage system according to the present first embodiment, the power management program 2111 of the management server 2000 controls operational states of the energized parts so that the electric energy consumption of the storage device 1000 stays at or under a prescribed upper limit during an operational period in order to adjust the total electric energy consumption of the storage device 1000 for the aforementioned period. Consequently, the storage device 1000 is capable of providing services required by the host server 3000 or the like while keeping the total electric energy consumption over the operational period to or within the prescribed upper limit value regardless of instantaneous increases/decreases in power consumption.

In addition, in the storage system according to the present first embodiment, the power management program 2111 of the management server 2000 creates a schedule of an operational state of each energized part during the operational period using past operation history of the storage device 1000, and sets an estimated value of the total electric energy consumption during the aforementioned operational period based on the schedule. Consequently, based on the past operation history of the storage device 1000, whether or not the total electric energy consumption during the aforementioned operational period will stay within the prescribed upper limit can be appropriately determined.

Furthermore, in the storage system according to the present first embodiment, the power management program 2111 of the management server 2000 limits state transitions using a state transition condition 21153. Consequently, the operational state of the storage device 1000 can be maintained so that the host server 3000 or the like are reliably provided with necessary services.

Moreover, in the storage system according to the present first embodiment, the power management program 2111 of the management server 2000 prioritizes power saving control units using a priority 21163. Consequently, detailed operations can be performed such as preferentially shifting a storage device 1000 or an RG storing data having low importance to a power saving state.

In addition, in the storage system according to the present first embodiment, the power management program 2111 of the management server 2000 outputs a notification prompting that power limitation information 2114 be re-created when it is predicted that the total electric energy consumption during the aforementioned operational period will not stay within the prescribed upper limit even when the storage device 1000 is operated according to the power limitation information 2114. Consequently, since the user is prompted to appropriately review the power limitation information 2114, the prospect of keeping the total electric energy consumption during the aforementioned operational period within the prescribed period increases.

Second Embodiment

A second embodiment of the present invention considers, in addition to the first embodiment, operations of an application of the host server 3000 which performs data input/output to/from a logical volume associated with the aforementioned power saving control unit of the storage device 1000 when a state transition of the power saving control unit is performed.

In the present second embodiment, an aforementioned application of the host server 3000 concludes data read/write processing before an RG of the storage device 1000 used by the application enters a power saving state and data read/write processing is disabled. Furthermore, when it is known that the RG will enter a power saving state and the operation of the application will be affected, the host server 3000 notifies, in advance, a service provision schedule of the application to an administrator and a client receiving the service of the application. Specifically, in addition to the configuration described in the first embodiment, the following items have been added or changed.

(Added/changed item 1) The state transition condition information 2115 retains, in addition to the information described in the first embodiment, usage and use schedule of the aforementioned application as the state transition condition 21153.

(Added/changed item 2) The state transition priority information 2116 retains a value that takes into account an importance of the aforementioned application.

(Added/changed item 3) Operations including activation, suspension and the like of the aforementioned application and service provision settings of the application are changed in accordance with state transitions of a RAID group that makes up a logical volume on which the application performs data input/output. For example, when a RAID group that makes up a logical volume on which a business application performs data input/output enters a slowdown state, the aforementioned application implements measures such as limiting the number of permitted simultaneous log-ins as long as the RAID group is in the slowdown state.

A configuration of a storage system according to the present second embodiment will be described below with reference to the drawings. Descriptions on components similar to those of the first embodiment will be omitted.

Figure 20:
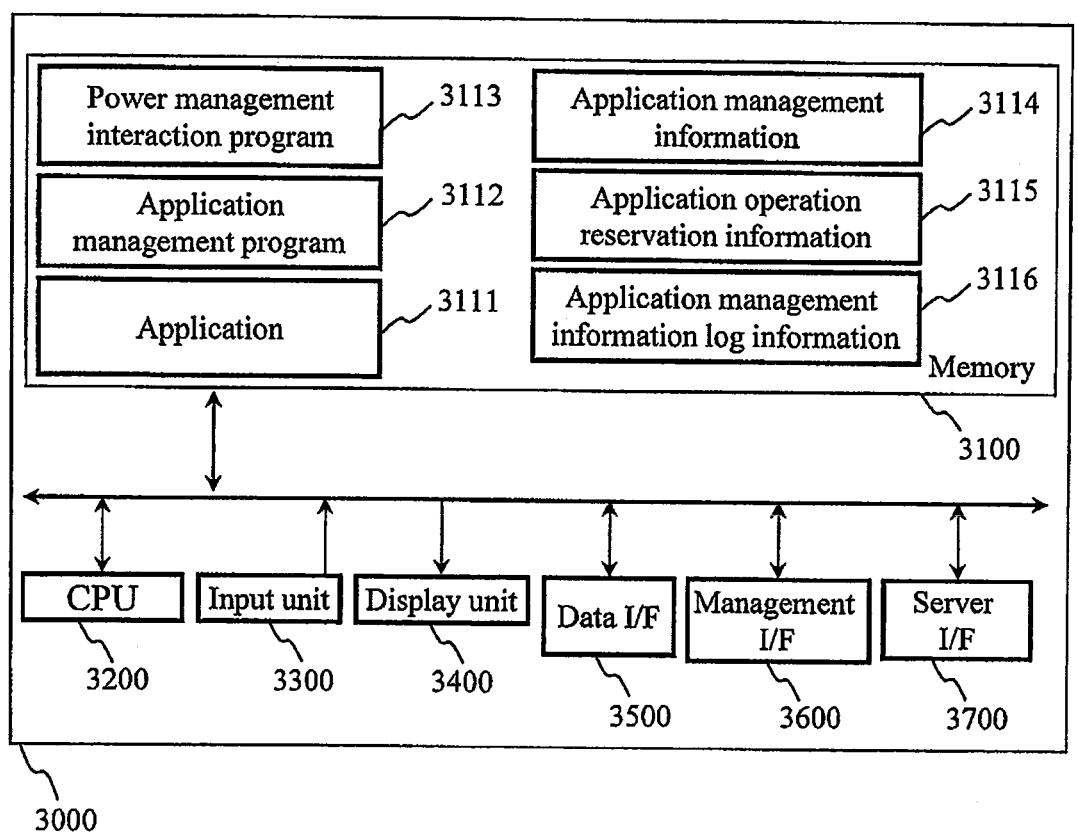
FIG. 20 is a block configuration diagram of a host server 3000 according to a second embodiment.

FIG. 20 is a block configuration diagram of a host server 3000 according to the present second embodiment. The host server 3000 is a general computing machine and includes a memory 3100, a CPU 3200, an input unit 3300, a display unit 3400, a data I/F 3500, a management I/F 3600, and a server I/F 3700.

The memory 3100 stores an application 3111, an application management program 3112, a power management interaction program 3113, application management information 3114, application operation reservation information 3115, and application management information log information 3116. A description thereof will be given later.

The CPU 3200 executes the respective programs stored in the memory 3100. Hereinafter, while the respective programs will be described as operating entities for convenience of description, it is to be understood that hardware which actually executes the respective programs is the CPU 3200.

The input unit 3300 is an input device such as a keyboard or a mouse.

The display unit 3400 is a screen display device such as a display.

The data I/F 3500 is an interface for connecting to a data network 5000.

The management I/F 3600 is an interface for connecting to the management network 4000.

The server I/F 3700 is an interface for connecting via a network such as a LAN to a client that receives services provided by an application such as a business program of the host server 3000.

The application 3111 is a software program to be executed by the CPU 3200. The application 3111 performs data read/write processing on a logical volume of the storage device 1000 via the data network 5000, and utilizes information resources. Examples of the application 3111 include a WEB application and a backup application, as well as business programs. A plurality of applications 3111 may exist.

The application management program 3112 is a software program to be executed by the CPU 3200. The application management program 3112 monitors the operational state of the application 3111 and creates a log thereof. The application management program 3112 also performs operations of various settings of the application 3111 including activation and suspension.

The power management interaction program 3113 is a software program to be executed by the CPU 3200. The power management interaction program 3113 grasps the operational states of the information resources of the storage device 1000 utilized by the application 3111, and instructs the application management program 3112 to perform operations of various settings of the application 3111 in accordance with the aforementioned operational states. In addition, the power management interaction program 3113 communicates with the power management program 2111 of the management server 2000 via the management network 4000, and mutually exchanges various information stored in the memory 2100 of the management server 2000 and various information stored in the memory 3100 of the host server 3000.

Furthermore, the power management interaction program 3113 notifies an administrator of the host server 3000 or the like and a client to which the application 3111 provides services to the effect that the operational state of the application 3111 has been changed. Moreover, while not shown, the power management interaction program 3113 retains, as a notify party list, a list including an administrator and clients to which services are provided from the application 3111.

FIG. 21 is a diagram showing a configuration example of application management information 3114 stored in the memory 3100. The application management information 3114 retains information indicating the operational state of the application 3111. When a plurality of applications 3111 exist, operational states of the respective applications are retained.

The application management information 3114 retains an application identifier 31141, an LU identifier 31142, an application operational state 31143, number of logins 31144, and an application importance 31145.

The application identifier 31141 retains an identifier of the application 3111.

The LU identifier 31142 retains an identifier of a logical volume of each storage device 1000 mounted as a data input/output destination by an application 3111 specified by the value of the application identifier 31141.

The application operational state 31143 retains a current operational state of an application 3111 specified by the value of the application identifier 31141. Operational states other than "in operation" and "suspended", such as "stand by", may be retained.

The number of logins 31144 retains the number of clients to whom service is provided from an application 3111 specified by the value of the application identifier 31141. While the number of logins is used as an indication on the assumption that login is necessary to receive services from the application 3111, when login is unnecessary, an indicator such as the number of connected clients may be used. Other indicators may also be used.

When there is a plurality of applications 3111 of the host server 3000, the application importance 31145 stores a priority that determines an order in which state transitions to a power saving state are to be performed on power saving control units of the storage device 1000 to be used by the respective applications 3111. Values and settings of application importance will be described later.

Information regarding the application 3111 stored in application management information 3114 are not limited to the above. For example, capability information such as a data transfer amount, the number of transfers, and the like, as well as statistical information of the application 3111 may be stored.

FIG. 22 is a diagram showing a configuration example of application operation reservation information 3115 stored in the memory 3100. When the application 3111 includes a job that is executed regularly, the application operation reservation information 3115 retains an execution schedule thereof.

The application operation reservation information 3115 retains an application identifier 31151, a reservation job identifier 31152, and a reservation job time 31153.

The application identifier 31151 retains an identifier of the application 3111.

When there is a job scheduled to be executed by the aforementioned application 3111, the reservation job identifier 31152 retains an identifier of the job concerned.

The reservation job time 31153 retains a job execution schedule time of a job identified by a value of the reservation job identifier 31152. When the logical volume of the storage device 1000 to be used for data input/output differs for each job, it is assumed that a reservation job time 31153 may be retained for each reservation job identifier 31152.

The application management information log information 3116 retains past application management information 3114 and a time thereof. For example, whenever information stored in the application management information 3114 is updated, the application management information log information 3116 additionally stores the time of the change and the application management information 3114 before or after the change. The application management information log information 3116 may be provided for each host server 3000 in the memory 3100 of the management server 2000.

FIG. 23 is a diagram showing a configuration example of state transition condition information 2115 stored in the memory 2100 of the management server 2000. In addition to the configuration described with reference to FIG. 10 in the first embodiment, application limitation 21156 has been added to the state transition condition 21153. A detailed description thereof will be presented later.

It is assumed that the application management program 3112 constantly monitors the application 3111 and keeps the application management information 3114 up to date. It is further assumed that the application management program 3112 stores the reservation state of a job of the application 3111 in the application operation reservation information 3115 and constantly keeps the reservation state updated. Furthermore, when there is a change in the application management information 3114, it is assumed that the application management program 3112 adds the data and the time of the application management information 3114 concerned as a past log to the application management information log information 3116.

Heretofore, a configuration of the storage system according to the present second embodiment has been described. Next, operations of the storage system according to the present second embodiment will be described.

(1. Operations During Initial Setting)

First, operations during initial setting of the storage system according to the present second embodiment will be described. However, a description on the same operations as the first embodiment will be omitted, and the description will center around differences mainly related to the host server 3000.

A user sets an importance of the application 3111 via the input unit 3300 of the host server 3000. The application management program 3112 of the host server 3000 stores the set value in the application importance 31145 of the application management information 3114. With the application importance 31145, it is assumed that a minimum value of "1" represents a highest importance and the larger the figure, the lower the importance. In addition, it is assumed that an RG used by an application with low importance is subjected to state transition to a power saving state early in the order.

The method of assigning values of the application importance 31145 is not limited to that described above. In addition, it is assumed that the application management information 3114 retains an application importance 31145 for each LU identifier 31142 of each application identifier 31141. When the application identifier 31141 is the same and the LU identifier 31142 is different, the value of application importance 31145 is the same. When a plurality of application identifiers 31141 is using the same RAID group 1111, there may be a case where the application identifiers 31141 differ and the LU identifiers 31142 differ. In such a case, the application importance 31145 of each LU identifier 31142 may be considered the same.

The value of the application importance 31145 may be arranged so as to vary with time. In this case, it is assumed that the application management information 3114 conjunctionally retains the period over which the application importance 31145 is applied concerned.

In addition, when a plurality of host servers 3000 connect to the same storage device 1000 and perform data input/output, application management programs 3112 may work in association with each other among a plurality of host servers 3000 to set the application importance 31145. Alternatively, the power management program 2111 of the management server 2000 may collectively manage the application importance 31145.

Hereinafter, items to be added/changed to/from the respective diagrams explained in the first embodiment will be described.

(FIG. 15: Step S2111A3)

In addition to the operations described in the first embodiment, the power management program 2111 of the management server 2000 notifies a period of the power consumption history log information 2113 selected by the user to the power management interaction program 3113 of the host server 3000. Upon receiving the notification, the power management interaction program 3113 notifies past application management information 3114 and a time thereof stored in application management information log information 3116 corresponding to the notified period to the power management program 2111.

(FIG. 15: Step S2111A4)

In addition to the operations described in the first embodiment, for each measurement time 21132 of the power consumption history log information 2113 selected by the user, the power management program 2111 associates past application management information 3114 of the application management information log information 3116 consistent with the aforementioned measurement time 21132 with the power limitation information 2114. The present operation is executed when the power management program 2111 creates power limitation information 2114.

(FIG. 15: Step S2111A5: Additional Operation 1)

The power management program 2111 references the application management information 3114 and the volume management information 2112, and additionally displays, for the user, a power saving control unit 21151 corresponding to the application identifier 31141.

(FIG. 15: Step S2111A5: Additional Operation 2)

For each state after transition 21152 of a power saving control unit 21151 corresponding to each application identifier 31141, the user sets an application limitation 21156 together with the scheduled excess electric energy limitation 21154 and the time limitation 21155 of the state transition condition information 2115. The power management program 2111 stores the setting result. The application limitation 21156 is a value to be applied as a state transition condition. The value to be set as application limitation 21156 is any of an application operational state 31143, the number of logins 31144, and an application importance 31145 corresponding to the application identifier 31141 that is the same as the power saving control unit 21151 concerned, or a combination thereof. When the application management information 3114 retains information other than the above, such information may be used as the value of the application limitation 21156.

In the data example shown in FIG. 23, "number of logins: 100 or less" is set in the application limitation 21156 for the state after transition 21152 "slowdown" of the power saving control unit 21151 "RG03". In this case, if the application identifier 31141 corresponding to the aforementioned power saving control unit 21151 is "application A", the condition according to the application limitation 21156 is applied only when the value of the number of logins of the application A is 100 or less. When the number of logins of the application A is greater than 100, the condition is not applied and the power saving control unit 21151 operates in the normal state.

Moreover, when a plurality of application identifiers 31141 correspond to the same power saving control unit 21151, the power saving control unit 21151 is assumed to have a plurality of application limitations 21556 for each state after transition 21152. In this case, transition to the operational state indicated by the state after transition 21152 is performed only when the aforementioned power saving control unit 21151 corresponds to all of the plurality of application limitations 21156 and also corresponds to other conditions in the state transition condition 21153.

(FIG. 15: Step S2111A5: Additional Operation 3)

The power management program 2111 references application operation reservation information 3115. When the state after transition 21152 of the power saving control unit 21151 corresponding to the application identifier 31151 is "suspended", the power management program 2111 stores, in the time limitation 21155, a time slot other than the time stored in the reservation job time 31153. In other words, it is assumed that a power saving control unit 21151 to be used by the application 3111 is not to be changed to a suspended state during the time slot in which an operation of the application 3111 concerned is reserved by a job. Moreover, the aforementioned processing may be applied to a slowdown state through user settings to disable a transition to the slowdown state during a time slot for which a job has been reserved. Furthermore, depending on the application 3111 or the job, the processing may be set so as not to be performed.

(FIG. 15: Step S2111A6: Additional Operation 1)

The power management program 2111 references the application management information 3114 and the volume management information 2112, and additionally displays, for the user, power saving control units 21151 corresponding to the application identifier 31141.

(FIG. 15: Step S2111A6: Additional Operation 2)

In addition to the operations described in the first embodiment, the power management program 2111 references the application importance 31145 of the application management information 3114 when setting the priority 21163 of the state transition priority information 2116. The power management program 2111 stores the value of the application importance 31145 in the priority 21163 of the power saving control unit 21151 corresponding to the LU identifier 31142 of each application identifier 31141. Furthermore, when different LU identifiers 31142 correspond to the same power saving control unit 21151, it is assumed that the power management program 2111 stores whichever of the aforementioned LU identifiers 31142 whose value of the application importance 31145 is smaller. Moreover, the result of the present step maybe displayed to the user, whereby the user may further change settings.

(FIG. 16: Step S2111B5)

In addition to the operations described in the first embodiment, the power management program 2111 references past application management information 3114 of application management information log information 3116 associated with each piece of power limitation information 2114. The power management program 2111 judges whether or not the application limitation 21156 of the state transition condition information 2115 matches the information (any of an application operational state 31143, the number of logins 31144, an application importance 31145, or a combination thereof) described in the application management information 3114 concerned. When the conditions of the scheduled excess electric energy limitation 21154, the time limitation 21155, and the application limitation 21156 are all consistent, the power management program 2111 proceeds to step S2111B6, and if any of the conditions is not consistent, the power management program 2111 proceeds to step S2111B7.

(2. Operations of Storage Device 1000 During System Operation)

Next, operations during system operation of the storage system according to the present second embodiment will be described. However, a description on the same operations as the first embodiment will be omitted, and the description will center around differences mainly related to the host server 3000.

(FIG. 19: Step S2111E5)

In addition to the operations described in the first embodiment, in the same manner as in step S2111B5, the power management program 2111 judges whether or not the application limitation 21156 can be applied.

(FIG. 18: Step S2111D8: Additional Operation 1)

Prior to the processing described in the first embodiment, the power management program 2111 references power limitation information 2114 whose scheduled time 21141 matches the current time 21191, selects a combination of an energized part 21142 whose value of the state transition schedule 21145 is not "--" and the state transition schedule 21145. Next, the power management program 2111 references volume management information 2112 and selects a host server 3000 using the selected energized part 21142. The power management program 2111 notifies a scheduled time 21141, the selected energized part 21142, and the state transition schedule 21145 to the power management interaction program 3113 of the aforementioned host server 3000.

(FIG. 18: Step S2111D8: Additional Operation 2)

The power management interaction program 3113 of the host server receives the aforementioned notification from the power management program 2111, references the application management information 3114, and references an application identifier 31141 corresponding to the notified energized part 21142 and an application operational state 31143 thereof. If the notified state after transition 21142 is a state where normal data input/output can be performed to/from an RG such as the normal state or the slowdown state, the power management interaction program 3113 instructs the application management program 3112 to operate the application 3111 concerned in an operational state that enables data input/output such as the normal operational state. If the notified state after transition 21142 is a state where normal data input/output cannot be performed to/from the RG such as the suspended state, an instruction is issued to the application management program 3112 to change the application 3111 to a state that does not enable data input/output to the storage device 1000 such as the stand-by state or the suspended state.

(FIG. 18: Step S2111D8: Additional Operation 3)

Next, the application management program 3112 receives the aforementioned instruction from the power management interaction program 3113, operates the operational state of the application 3111, and updates the application management information 3114.

(FIG. 18: Step S2111D8: Additional Operation 4)

Next, the power management interaction program 3113 references the application management information 3114, confirms that the application operational state 31143 has been changed in accordance with the aforementioned instruction, and notifies a completion of change of the application operational state 31143 to the power management program 2111 of the management server 2000. Before receiving the aforementioned instruction from the power management interaction program 3113, the power management interaction program 3113 may notify an administrator and a client currently using the application 3111 that a state change of the application will be started.

(FIG. 18: Step S2111D8: Additional Operation 5)

In the additional operation 1 above, a description has been given of the power management program 2111 notifying only the power limitation information 2114 of a scheduled time 21141 matching the current time 21191 to the power management interaction program 3113. In addition thereto, the power management program 2111 may notify power limitation information 2114 corresponding to all scheduled times 21141 from the current time 21191 to the end time 21193 to the power management interaction program 3113. In this case, the power management interaction program 3113 notifies, in advance, an operational state schedule for each application 3111 from the current time 21191 to the end time 21193 to an administrator and a client to receive services from the application 3111, and announces a service provision schedule of the application 3111.

(FIG. 18: Step S2111D8: Additional Operation 6)

The power management program 2111 of the management server 2000 receives a change completion notification of the application operational state 31143 from the power management interaction program 3113. The power management program 2111 executes the processing of step S2111D8 described in the first embodiment.

Heretofore, operations of the storage system according to the present second embodiment during system operation has been described.

As described above, in the storage system according to the present second embodiment, the management server 2000 retains, as state transition condition 21153, a correspondence relationship between an operational state of the application 3111 from the host server 3000 and operational states to which each power saving control unit can transition. Consequently, since power saving control of the storage device 1000 can be performed while giving due consideration to the operational state of the application 3111, the electric energy consumption during the aforementioned period can be kept within a prescribed upper limit while reliably providing services of the storage device 1000 required by the application 3111.

In addition, in the storage system according to the present second embodiment, the management server 2000 sets a value avoiding a reservation job time 311533 as the value of time limitation 21155. Consequently, services of the storage device 1000 required by the application 3111 can be reliably provided during a time slot in which the aforementioned job is executed.

Furthermore, in the storage system according to the present second embodiment, the management server 2000 can estimate an operation of the application 3111 during the aforementioned period using past application management information 3114 retained by the application management information log information 3116, and create power limitation information 2114 based thereon. Consequently, an operational state of the storage device 1000 to be required by the application 3111 during the aforementioned operational period can be accurately estimated and an operational schedule preferable to the application 3111 can be created.

Third Embodiment

In a third embodiment of the present invention, a different operation example when creating power limitation information 2114 will be described. Components of the respective devices and other operations are the same as the first and second embodiments.

Figure 24:
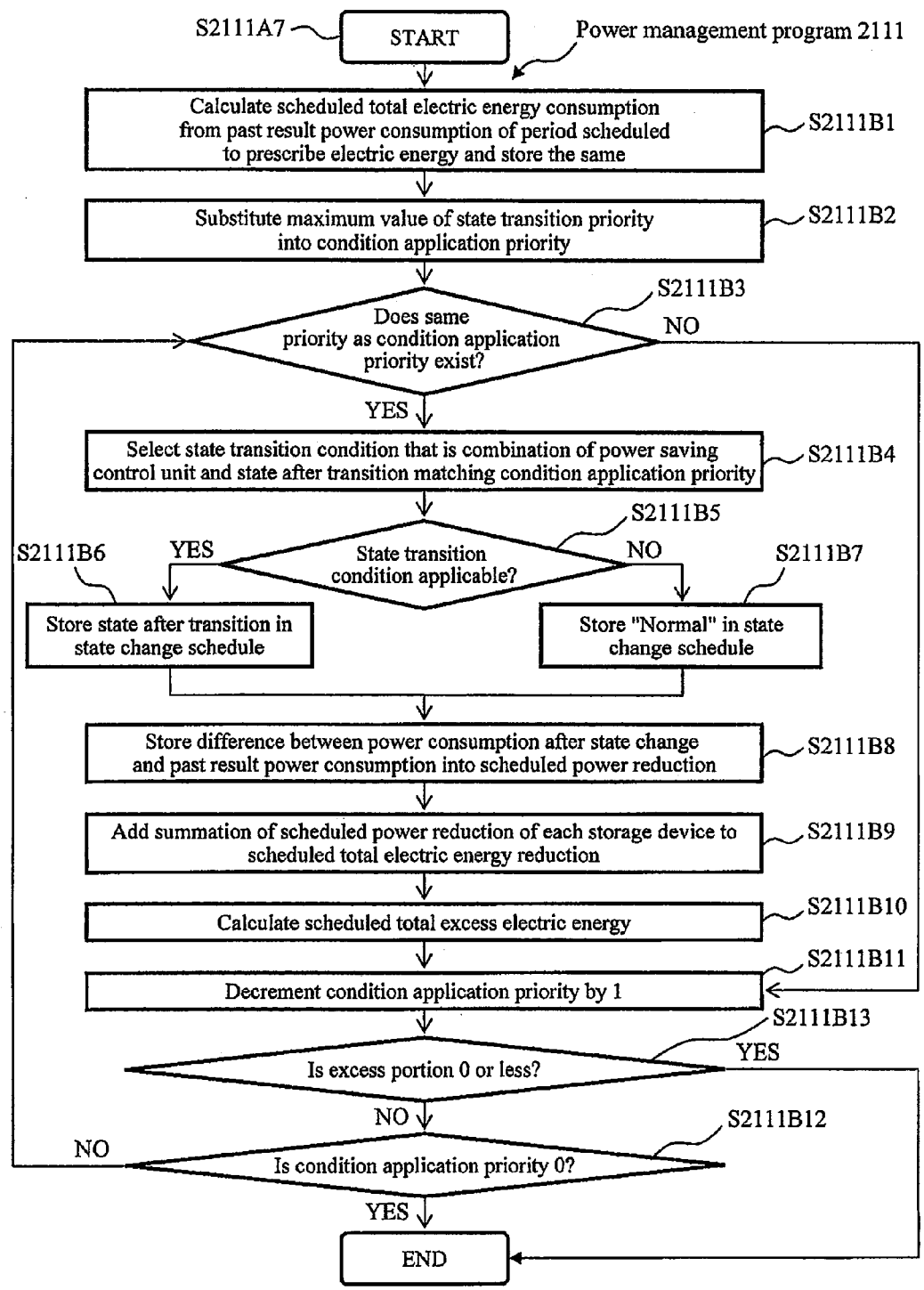
FIG. 24 is a diagram showing details of step S2111A7 shown in FIG. 15 according to a third embodiment.

FIG. 24 is a diagram showing details of step S2111A7 shown in FIG. 15 according to the present third embodiment. Hereinafter, the respective steps shown in FIG. 24 will be described.

(FIG. 24: Steps S2111B1 to S2111B12)

These steps are the same as in FIG. 16 described in the first embodiment. However, a step S2111B13 has been newly inserted between steps S2111B11 and S2111B12.

(FIG. 24: Step S2111B13)

The power management program 2111 judges whether or not the scheduled total excess electric energy 21174 is equal to or lower than 0. If equal to or lower than 0, it is judged that the respective energized parts do not need to be additionally subjected to state transitions and the present operation flow is terminated. If greater than 0, it is judged that the energized parts must be additionally subjected to state transitions to reduce power consumption, and the flow proceeds to step S2111B12.

Figure 25:
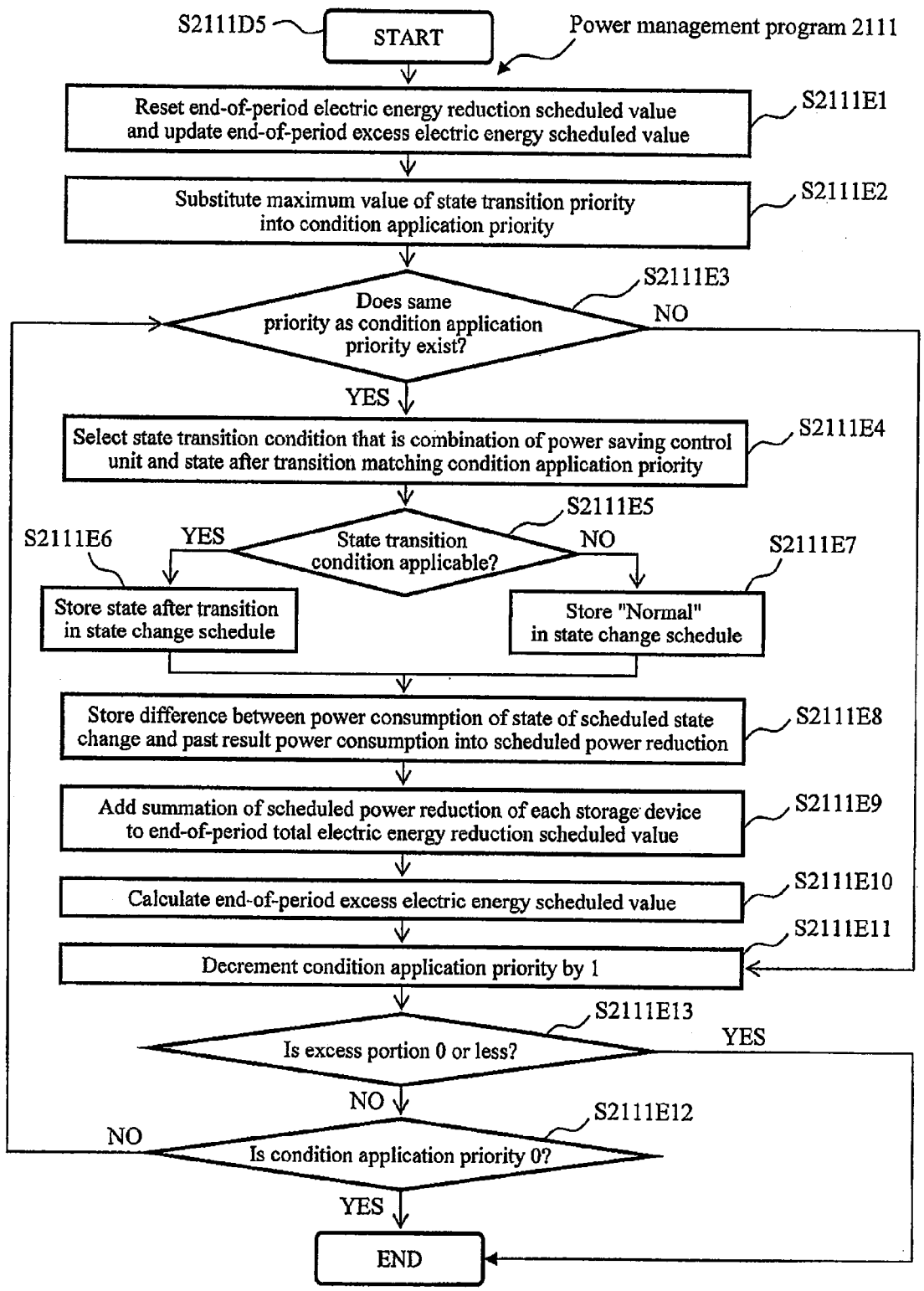
FIG. 25 is a diagram showing details of step S2111D4 shown in FIG. 18 according to the third embodiment.

FIG. 25 is a diagram showing details of step S2111D4 shown in FIG. 18 according to the present third embodiment. Hereinafter, the respective steps shown in FIG. 25 will be described.

(FIG. 25: Steps S2111E1 to S2111E12)

These steps are the same as in FIG. 19 described in the first embodiment. However, a step S2111E13 has been newly inserted between steps S2111E11 and S2111E12.

(FIG. 25: Step S2111E13)

The power management program 2111 judges whether or not the end-of-period excess electric energy scheduled value 21185 is equal to or lower than 0. If equal to or lower than 0, it is judged that the respective energized parts do not need to be additionally subjected to state transitions and the present operation flow is terminated. If greater than 0, it is judged that the energized parts must be additionally subjected to state transitions to reduce power consumption, and the flow proceeds to step S2111E12.

Heretofore, in the present third embodiment of the present invention, a different operation example when creating power limitation information 2114 has been described. Since the present third embodiment is arranged so as to prevent further state transition at a time point immediately before the electric energy consumption of the storage device 1000 during the operational period exceeds a prescribed upper limit of the electric energy consumption for the aforementioned period, power limitation information 2114 can be created so that a maximum electric energy can be consumed within the range of the prescribed upper limit. Accordingly, since the storage device 1000 can consume more power within the range of the prescribed upper limit, services required by an application or the like using the storage device 1000 can be provided more reliably.

While the present third embodiment has been arranged so that the operational flows shown in FIGS. 23 and 24 are concluded at a time point where the scheduled total excess electric energy 21174 or the end-of-period excess electric energy scheduled value 21185 reaches or falls below 0, a predetermined threshold may be used instead of 0. Accordingly, the leeway with respect to the prescribed upper limit of power consumption can also be adjusted.

Forth Embodiment

While the first to third embodiments above have been described such that operations of the management server 2000 are to be prescribed by a power management program, the same operations can also be realized using hardware such as a microcomputer or a programmable device. In addition, the hardware can be built into the storage device 1000 so as to equip the storage device 1000 itself with a function equivalent to the management server 2000.

REFERENCE SIGNS LIST

1000: Storage device
1100: Disk device
1111: RAID group
1200: Disk controller
1210: Main memory
1211: Power control program
1212: Device configuration information
12121: RG number
12122: LU number
1213: Device power information
12131: Energized part
12132: Power consumption 12133: Power state
1214: Power saving control unit information
12141: Power saving control unit
12412: Normal state power
12413: Slowdown state power
12414: Suspended state power
1220: CPU
1230: Host I/F
1240: Management I/F
1250: Disk I/F
1260: Cache memory
1300: Fan
1400: Power source
2000: Management server
2100: Memory
2111: Power management program
2112: Volume management information
21121: Storage information
21122: RG number
21123: LU number
21124: Mount information
2113: Power consumption history log information
21131: Energized part
21132: Measurement time
21133: Power consumption log
21134: State log
2114: Power limitation information
21141: Scheduled time
21142: Energized part
21143: Past result power consumption
21144: Past result state
21145: State transition schedule
21146: Scheduled power reduction
2115: State transition condition information
21151: Power saving control unit
21152: State after transition
21153: State transition condition
21154: Scheduled excess electric energy limitation
21155: Time limitation
21156: Application limitation
2116: State transition priority information
21161: Power saving control unit
21162: State after transition
21163: Priority
2117: Scheduled total electric energy information
21171: Prescribed electric energy
21172: Scheduled total electric energy consumption
21173: Scheduled total electric energy reduction
21174: Scheduled total excess electric energy
2118: Electric energy limitation information
21181: Current electric energy consumption scheduled value
21182: Current electric energy consumption
21183: Current excess electric energy
21184: End-of-period electric energy reduction scheduled value
21185: End-of-period excess electric energy scheduled value
2119: Time management information
21191: Current time
21192: Start time
21193: End time
2200: CPU
2300: Input unit
2400: Output unit
2500: Management I/F
3000: Host server
3100: Memory
3111: Application
3112: Application management program
3113: Power management interaction program
3114: Application management information
31141: Application identifier
31142: LU identifier
31143: Application operational state
31144: Number of logins
31145: Application importance
3115: Application operation reservation information
31151: Application identifier
31152: Reservation job identifier
31153: Reservation job time
3116: Application management information log information
3200: CPU
3300: Input unit
3400: Display unit
3500: Data I/F
3600: Management I/F
3700: Server I/F
4000: Management network
5000: Data network

The invention claimed is:

1. A storage system comprising:
a storage device including a plurality of storage units; and
a management device that manages operations of the storage device, wherein
the management device:
acquires a predetermined period for monitoring electric energy to be consumed by the plurality of storage units, and a total electric energy consumption upper limit value for the plurality of storage units during the predetermined period,
acquires a past operational state and an electric power consumption under the past operational state of the plurality of storage units,
estimates, according to the acquired past operational state and the electric power consumption under the past operational state, an electric energy to be consumed by the plurality of the storage units during the predetermined period,
if the estimated electric energy exceeds the total electric energy consumption upper limit value, creates control information for controlling the one or more storage units included in the storage device to perform in a low power consumption state for a certain term of the predetermined period, so that the estimated electric energy would not exceed the total electric energy consumption upper limit value, and
controls, according to the control information, an electric power state of the plurality of storage units.

2. The storage system according to claim 1, comprising
a host server that writes data into or reads data from the storage device, wherein
the host server retains an operation history of an application running on the host server, and
executes, at a predetermined reservation time, processing set so as to be executed at the reservation time,
the plurality of storage units including one or more energized parts,
the one or more energized parts operate in a normal operational state and a plurality of operational states with lower power consumption than the normal operational state,
the management device is a management server constituted by an electronic computer,
the management server includes first state transition condition information describing a condition under which the energized part can transition to an operational state whose power consumption is lower than the normal operational state,
   state transition priority information describing which of the operational states the energized part should preferentially transition to, and
   second state transition condition information describing a correspondence relationship between an operational state of an application running on the host server, the reservation time, and whether or not the energized part can transition to an operational state whose power consumption is lower than the normal operational state,
the management server
   acquires a predetermined period for monitoring an electric energy to be consumed by the plurality of storage units, and a total electric energy consumption upper limit value for the plurality of storage units during the predetermined period,
   acquires a past operational state and an electric power consumption under the past operational state of the plurality of storage units,
   estimates, according to the acquired past operational state and the electric power consumption under the past operational state, an electric energy to be consumed by the plurality of the storage units during the predetermined period,
   if the estimated electric energy exceeds the total electric energy consumption upper limit value, creates control information for controlling the one or more storage units included in the storage device to perform in a low power consumption state for a certain term of the predetermined period, so that the estimated electric energy would not exceed the total electric energy consumption upper limit value,
   controls, according to the control information, an electric power state of the plurality of storage units,
   acquires a scheduled value of electric energy consumption of the storage device at one or more time points during the predetermined period based on a past operation state of the plurality of storage units,
   acquires a total value of the electric energy actually consumed by the plurality of storage units,
   acquires, as a scheduled electric energy reduction, a total value of electric energy consumption reducible up to an end time point of the predetermined period by controlling the power consumption of the plurality of storage units according to the control information,
   outputs a notification prompting correction of the control information when the scheduled value is exceeded even when subtracting the scheduled electric energy reduction from the total value of the electric energy actually consumed by the plurality of storage units,
   acquires a schedule according to which the host server accesses the storage device,
   controls power consumption of the plurality of storage units so as not to exceed the total electric energy consumption upper limit value, and
   sets an estimated value of the operational state of the application based on the operation history,
the control information:
   is pursuant to a condition described in the first state transition condition information, a priority described in the state transition priority information, and a condition described in the second state transition condition information,
   is configured to maintain the operational state of the plurality of storage units so as to enable the application to access the storage device according to the estimated value of the operational state of the application, and
   is configured so as to change, when a total estimated value of the electric energy to be consumed by the energized parts during the predetermined period exceeds the total electric energy consumption upper limit value, an operational state of one or more energized parts to an operational state whose power consumption is lower than the normal operational state.

3. The storage system according to claim 1, wherein
the plurality of storage units include one or more energized parts,
the one or more energized parts operate in a normal operational state and an operational state with lower power consumption than the normal operational state, and
the management device controls the power consumption thereof by controlling the operational state of the one or more energized parts between a normal operational state and an operational state with lower power consumption than the normal operational state.

4. The storage system according to claim 3, wherein
the management device
includes state transition condition information describing a condition under which the one or more energized parts can transition to the operational state whose power consumption is lower than the normal operational state, and
controls the power consumption of the energized part after causing a transition of the operational state of the one or more energized parts according to the condition described by the state transition condition information.

5. The storage system according to claim 3, wherein
the management device
   includes state transition priority information describing which of the normal operational state and the operational state with lower power consumption the one or more energized parts should preferentially transition to, and
   controls the power consumption of the energized part after causing a transition of the operational state of the one or more energized parts according to the priority described by the state transition priority information.

6. The storage system according to claim 1, wherein
the management device
   acquires a scheduled value of electric energy consumption of the storage device at one or more time points during the predetermined period based on a past operational state of the plurality of storage units,
   acquires a total value of the electric energy actually consumed by the plurality of storage units,
   acquires, as a scheduled electric energy reduction, a total value of electric energy consumption reducible up to an end time point of the predetermined period by controlling the power consumption of the plurality of storage units according to the control information, and
   outputs a notification prompting correction of the control information when the scheduled value is exceeded even when subtracting the scheduled electric energy reduction from the total value of the electric energy actually consumed by the plurality of storage units.

7. The storage system according to claim 1, wherein
the management device
includes a display device that displays the operational state, and an input device that receives input specifying all of or a part of the operational state,
creates control information for controlling power consumption of the plurality of storage units using a specified portion of the operational state received by the input device, and
controls the power consumption of the plurality of storage units based on the control information.

8. The storage system according to claim 1, including a host server that writes data into the storage device or reads data from the storage device, wherein the management device
acquires a schedule according to which the host server accesses the storage device,
maintains operational states of the plurality of storage units so as to enable the host server to access the storage device according to the schedule, and controls power consumption of the plurality of storage units so as not to exceed the total electric energy consumption upper limit value.

9. The storage system according to claim 8, wherein
the host server executes, at a predetermined reservation time, processing set so as to be executed at the reservation time,
the management device
includes state transition condition information includes corresponding relationship between the reservation time and whether or not the storage units can transition to other operational states and describes a correspondence relationship between the reservation time and whether or not the plurality of storage units can transition to an operational state whose power consumption is lower than the normal operational state, and
controls the power consumption of the plurality of storage units after causing a transition of the operational state of the plurality of storage units according to the condition described by the state transition condition information.

10. The storage system according to claim 8, wherein
the host server retains an operation history of an application running on the host server,
the management device
sets an estimated value of the operational state of the application based on the operation history, and
creates the control information for maintaining an operational state of the plurality of storage units so as to enable the application to access the storage device according to the operational state, and controlling power consumption of the plurality of storage units so that the total electric energy value to be consumed by the plurality of storage units during the predetermined period does not exceed the total electric energy consumption upper limit value.

11. The storage system according to claim 1, comprising:
a host server that writes data into or reads data from the storage device, wherein
the host server
retains an operation history of an application running on the host server, and
executes, at a predetermined reservation time, processing set so as to be executed at the reservation time,
the plurality of storage units include one or more energized parts,
the one or more energized parts operate in a normal operational state and a plurality of operational states with lower power consumption than the normal operational state,
the management device is a management server constituted by an electronic computer,
the management server includes
state transition condition information describing a condition under which the one or more energized parts can transition to an operational state whose power consumption is lower than the normal operational state, and
state transition priority information describing which of the operational states the one or more energized parts should preferentially transition to,
the management server
acquires a predetermined period for monitoring an electric energy to be consumed by the plurality of storage units, and a total electric energy consumption upper limit value for the plurality of storage units during the predetermined period,
acquires a past operational state and an electric power consumption under the operational state of the plurality of storage units,
estimates, according to the acquired past operational state and the electric power consumption under the operational state, an electric energy to be consumed by the plurality of the storage units during the predetermined period,
if the estimated electric energy exceeds the total electric energy consumption upper limit value, creates control information for controlling the one or more storage units included in the storage device to perform in a low power consumption state for a certain term of the predetermined period, so that the estimated electric energy would not exceed the total electric energy consumption upper limit value,
controls, according to the control information, an electric power state of the plurality of storage units,
acquires a scheduled value of electric energy consumption of the storage device at one or more time points during the predetermined period based on a past operational state of the plurality of storage units,
acquires a total value of the electric energy actually consumed by the plurality of storage units,
acquires, as a scheduled electric energy reduction, a total value of electric energy consumption reducible up to an end time point of the predetermined period by controlling the power consumption of the plurality of storage units according to the control information,
outputs a notification prompting correction of the control information when the scheduled value is exceeded even when subtracting the scheduled electric energy reduction from the total value of the electric energy actually consumed by the plurality of storage units,
acquires a schedule according to which the host server accesses the storage device,
maintains an operational state of the plurality of storage units so as to enable the host server to access the storage device according to the schedule, and controls power consumption of the plurality of storage units so as not to exceed the total electric energy consumption upper limit value, and
sets an estimated value of the operational state of the application based on the operation history, the control information is pursuant to a condition described in the state transition condition information, and a priority described in the state transition priority information, is configured to maintain an operational state of the plurality of storage units so as to enable the application to access the storage device according to the estimated value of the operational state of the application, and is configured so as to change, when a total estimated value of the electric energy to be consumed by the one or more energized parts during the predetermined period exceeds the total electric energy consumption upper limit value, an operational state of one or more energized parts to an operational state whose power consumption is lower than the normal operational state.

12. A method of controlling a storage device including a plurality of storage units, the method comprising steps of:

acquiring a predetermined period for monitoring an electric energy to be consumed by the plurality of storage units, and a total electric energy consumption upper limit value for the plurality of storage units in the predetermined period, acquiring a past operational state and an electric power consumption under the operational state of the plurality of storage units, estimating, according to the acquired past operational state and the electric power consumption under the operational state, an electric energy to be consumed by the plurality of the storage units in the predetermined period, creating control information for controlling the one or more storage units included in the storage device to perform in a low power consumption state in a certain period of the predetermined period, so that the estimated electric energy would not exceed the total electric energy consumption upper limit value, and controlling, according to the control information, an electric power state of the plurality of storage units.

* * * * *